US012236733B2

(12) United States Patent
Singh et al.

(10) Patent No.: US 12,236,733 B2
(45) Date of Patent: Feb. 25, 2025

(54) SYSTEM AND METHOD FOR VEHICLE-SPECIFIC INSPECTION AND RECONDITIONING

(71) Applicant: BacklotCars, Inc., Kansas City, MO (US)

(72) Inventors: Shuchita Singh, Westwood, KS (US); Jason Houseworth, Olathe, KS (US)

(73) Assignee: BacklotCars, Inc., Kansas City, MO (US)

( * ) Notice: Subject to any disclaimer, the term of this patent is extended or adjusted under 35 U.S.C. 154(b) by 395 days.

(21) Appl. No.: 17/412,690

(22) Filed: Aug. 26, 2021

(65) Prior Publication Data

US 2022/0222984 A1  Jul. 14, 2022

Related U.S. Application Data

(60) Provisional application No. 63/070,477, filed on Aug. 26, 2020.

(51) Int. Cl.
*G07C 5/08* (2006.01)
*G06Q 30/0201* (2023.01)
*G07C 5/00* (2006.01)

(52) U.S. Cl.
CPC ....... *G07C 5/0816* (2013.01); *G06Q 30/0206* (2013.01); *G07C 5/008* (2013.01)

(58) Field of Classification Search
CPC .... G07C 5/0816; G07C 5/008; G07C 5/0841; G07C 5/006; G06Q 30/0206
USPC ...................................................... 701/31.4
See application file for complete search history.

(56) References Cited

U.S. PATENT DOCUMENTS

| 8,230,362 | B2 | 7/2012 | Couch | |
|---|---|---|---|---|
| 10,089,396 | B2 | 10/2018 | Endras | |
| 10,445,389 | B2 | 10/2019 | Endras et al. | |
| 10,878,050 | B2 | 12/2020 | Endras et al. | |
| 10,997,413 | B2 | 5/2021 | Endras et al. | |
| 2005/0065678 | A1* | 3/2005 | Smith | G07C 5/008 701/1 |
| 2014/0005881 | A1* | 1/2014 | Hardesty | G07C 5/0808 701/32.8 |
| 2014/0379205 | A1* | 12/2014 | Muetzel | G07C 5/08 701/32.4 |
| 2017/0352104 | A1* | 12/2017 | Hanson | G06Q 40/08 |
| 2018/0276912 | A1* | 9/2018 | Zhou | G05B 23/0275 |

(Continued)

*Primary Examiner* — Tyler D Paige
(74) *Attorney, Agent, or Firm* — Lempia Summerfield Katz LLC

(57) ABSTRACT

A system and device for generating focused inspection recommendations and estimating a cost for reconditioning pre-owned vehicles. Embodiments of the invention provide for individualizing and streamlining the process of inspecting a pre-owned vehicle, and more particularly, for identifying components with historically high failure rates. Through analyzing several data inputs, including vehicle data, inspection and arbitration data, third-party data, and sensor data, a recommendation of a focused inspection of one or more components is provided. Additionally, the analysis further determines an estimated cost for reconditioning of the vehicle, based upon the analysis of the data inputs. The focused inspection recommendation and the estimated reconditioning cost can then be displayed to the inspector using a programmed user interface.

40 Claims, 18 Drawing Sheets

(56) References Cited

U.S. PATENT DOCUMENTS

2021/0090240 A1   3/2021  Nei et al.
2022/0222984 A1*  7/2022  Singh ................. G06Q 30/0206

* cited by examiner

SYSTEM AND METHOD FOR VEHICLE-SPECIFIC INSPECTION AND RECONDITIONING

RELATED APPLICATION

This non-provisional application claims the priority benefit of U.S. Provisional Patent Application No. 63/070,477, filed Aug. 26, 2020, and entitled "SYSTEM AND METHOD OF RECOMMENDING A VEHICLE-SPECIFIC INSPECTION AND ESTIMATING VEHICLE RECONDITIONING." U.S. Provisional Patent Application No. 63/070,477 is hereby incorporated by reference in its entirety into the present application.

BACKGROUND

1. Field

Embodiments of the invention relate to vehicle inspection and reconditioning estimation. Specifically, embodiments of the invention relate to generating a focused inspection recommendation and estimating reconditioning costs of vehicles.

2. Related Art

A pre-owned vehicle purchased by a dealer goes through an evaluation process to determine a condition of the vehicle and a process of reconditioning the vehicle for resale. Typically, dealer personnel inspect the vehicle and use the inspection data to determine the extent of reconditioning required to recondition the vehicle from wholesale to retail condition. The inspection completed by the dealer personnel is a general inspection that does not take into account particular problems with the specific vehicle that is being inspected. In addition to the general inspection, the cost of the vehicle reconditioning is also evaluated, and a purchase price and retail price of the vehicle may be based at least in part on the reconditioning cost. These inspection and reconditioning processes are limited and inefficient.

What is needed is a focused vehicle inspection process that is specific to both the make and model of the vehicle as well as the vehicle history specific to the selected vehicle. Inspection and arbitration data as well as part and failure rate data that is specific to vehicle make and models may be stored and analyzed. The data may be accessed to provide focused and personalized inspection based on the specific failure rates and vehicle reconditioning estimates. The systems and processes described herein provide more efficient pre-owned vehicle processing from dealer purchase to resale.

SUMMARY

Embodiments of the invention address the above-described need by providing for a focused vehicle inspection process that is specific to the make and model of the vehicle. In some embodiments, a focused inspection recommendation can be determined by analyzing data inputs indicative of the history and condition of the vehicle. In particular, the focused inspection recommendation can analyze the vehicle data specifically related to the selected vehicle such as, for example, the make and model, production year, Vehicle Identification Number (VIN), color, general condition, and any other information that may be associated with the vehicle. Further, the focused inspection recommendation may also be based at least in part on the arbitration data and inspection of the vehicle or parts of the vehicle and may further comprise historical data associated with the make and model of the vehicle, including but not limited to part recalls, part failure rates, and arbitration costs and payouts. Even further, the focused inspection recommendation may be also based at least in part on third-party data of the vehicle, including but not limited to vehicle ownership, registration location, owner location, purchase location or accident history. Additionally, the focused inspection recommendation may also be based at least in part on sensor data obtained from the selected vehicle. For example, the sound of the engine may be recorded and compared to the sound of a known properly working engine, or images or video of the vehicle can be recorded and compared to images of the same make and model of the vehicle having no defects. A likelihood of failure of at least one part of the vehicle, or the vehicle itself, can be determined through analysis of any combination of the above-described data inputs. The determined likelihood of failure may further be used in formulating the focused inspection recommendation. The focused inspection recommendation may then be displayed to an inspector, recommending a closer or additional inspection of one or more parts of the vehicle.

In some embodiments, the analysis of the above-described data inputs can further be used to estimate a reconditioning cost of the vehicle and to provide reconditioning estimates to take the vehicle from a wholesale condition to a retail condition. For example, the reconditioning estimate may be used by a dealer to determine if the purchase price of the vehicle compared to an estimated retail price will be profitable. If too many parts are in need of replacement or if there are too many parts that have a high likelihood of failure, it may not be profitable for the dealer to purchase the vehicle at wholesale. The estimated reconditioning cost can further be used as a baseline price when negotiating with a reconditioning service provider.

The system can be programmed to be used with a user interface and displayed on a computing device. In some embodiments, the computing device can comprise one or more peripherals or sensors to receive sensor data. For example, the computing device can comprise a microphone for recording the sound of the engine. Additionally, the computing device can comprise a camera for recording photographs or video of the vehicle. Further, the computing device can be communicatively coupled to the electronic vehicle management system of the vehicle to receive diagnostic data. For example, the computing device could be physically connected using a cable inserted into a diagnostic port (e.g., OBD-II port) or alternatively, could be wirelessly coupled through Bluetooth or other wireless method.

The system further allows for the communicatively coupling of a plurality of users using a plurality of computing devices programmed with the user interface. Using the user interface, a dealer seller may offer for sale a pre-owned vehicle to a dealer buyer in a dealer-to-dealer sell. The system can analyze the data inputs as described above and generate a focused inspection recommendation and an estimated reconditioning cost for the dealer buyer prior to purchasing the vehicle.

Thus, in one or some embodiments, a mobile computing device is disclosed. The mobile device includes: an output device; at least one memory, the at least one memory configured to store one or more programs; and at least one processor in communication with the output device and the at least one memory. The at least one processor is configured to execute instructions in the one or more programs to:

access vehicle data indicative of a selected vehicle, wherein the vehicle data comprises one or more of a make and model of a vehicle, engine information of the vehicle, mileage of the vehicle, a transmission type of the vehicle, a vehicle identification number (VIN) of the vehicle, a production year of the vehicle, a current location of the vehicle, or a location where the vehicle resides; responsive to analysis of the vehicle data in combination with failure rates associated with at least one component of the vehicle determining that the at least one component is designated as a potential fault item, access information indicative of instructing an inspector to obtain additional information regarding the potential fault item; cause at least one output on the output device, the at least one output including the information indicative of instructing the inspector to obtain the additional information regarding the potential fault item, the at least one output comprising one or both of a graphic highlighting part or all of the at least one component or a series of steps in order for the inspector to obtain the additional information regarding the potential fault item; responsive to generating the at least one output, receive input from the inspector; determine whether to designate the potential fault item as failing; and generate at least one output indicating whether the potential fault item is designated as failing.

This summary is provided to introduce a selection of concepts in a simplified form that are further described below in the detailed description.

BRIEF DESCRIPTION OF THE DRAWING FIGURES

Embodiments of the invention are described in detail below with reference to the attached drawing figures, wherein.

FIGS. 7A-E are GUIs of a sequence to guide the inspector to obtain one or more images of the vehicle and to evaluate the transmission.

Figure 8:
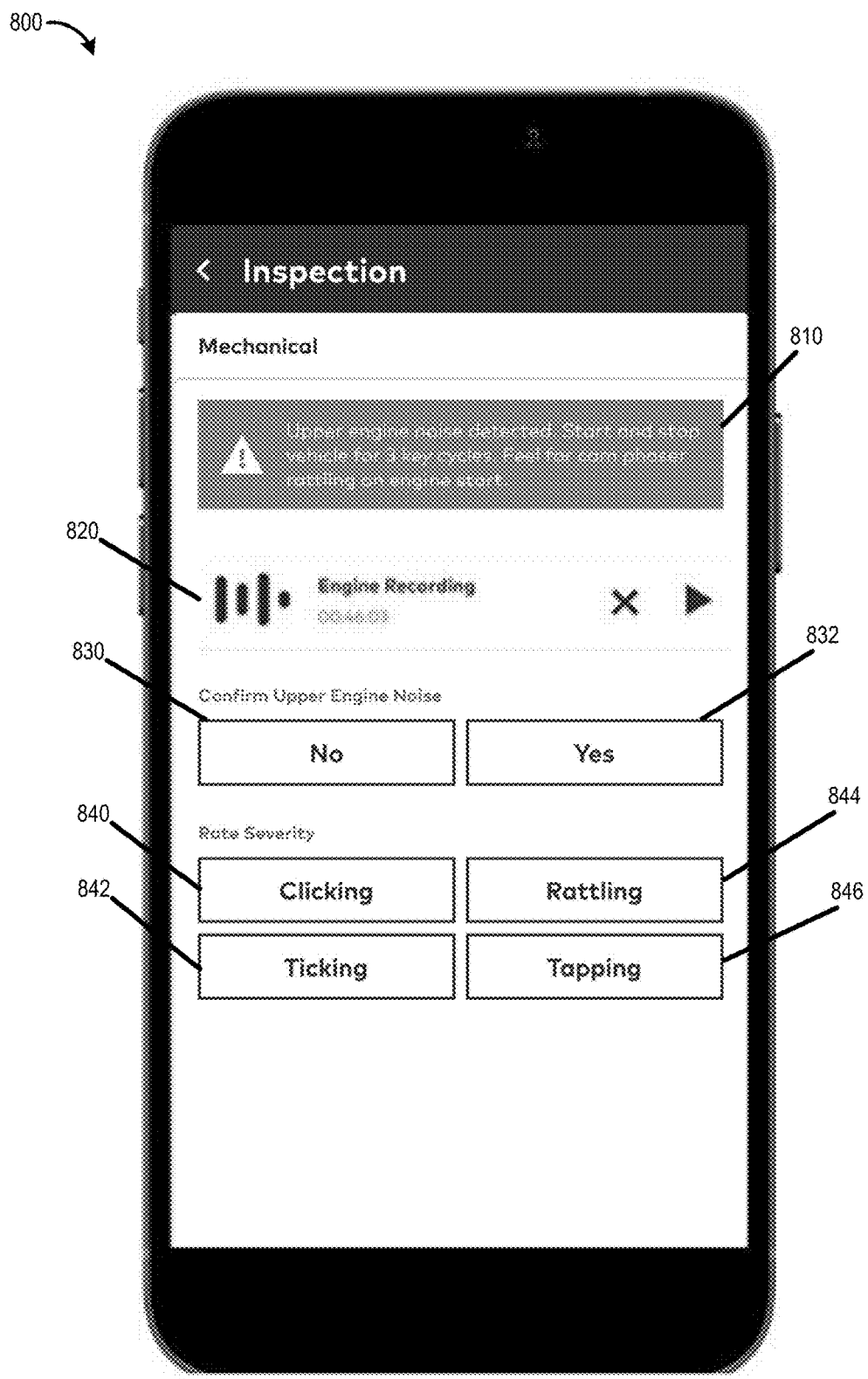

FIG. 8 is a GUI to guide the inspector to evaluate the engine of the vehicle.

Figure 9A:
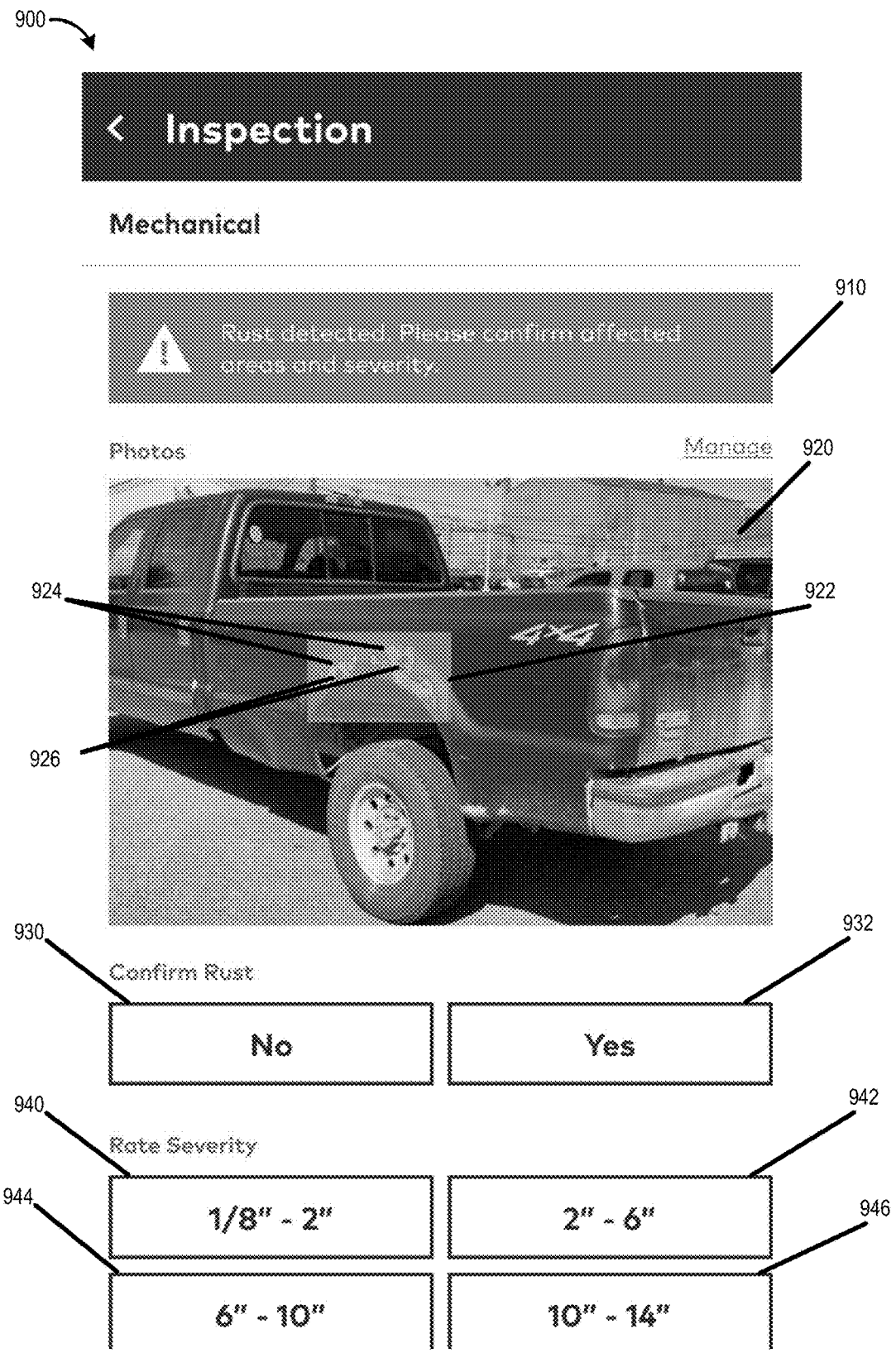
Figure 9B:
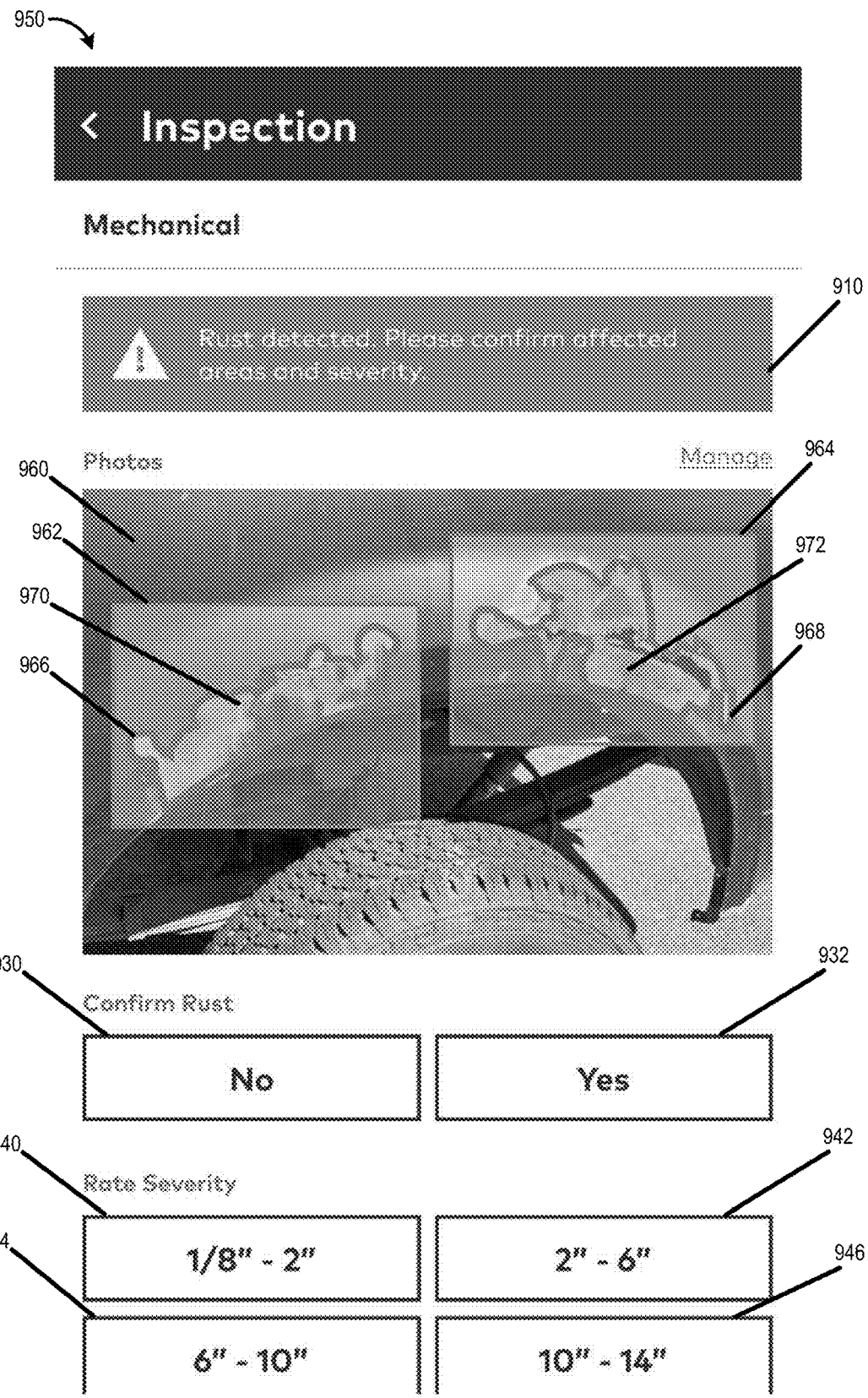

FIGS. 9A-B are GUIs to guide the inspector to evaluate whether rust is present in the vehicle.

DETAILED DESCRIPTION

Embodiments of the invention solve the above-described problems and provide a distinct advance in the art by providing a method and system for generating inspection recommendations that target specific vehicle problem areas. Further, reconditioning estimates may be generated based on historical data and the vehicle focused inspection.

The following description of embodiments of the invention references the accompanying illustrations that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense.

In this description, references to "one embodiment", "an embodiment", "embodiments", "various embodiments", "certain embodiments", "some embodiments", or "other embodiments" mean that the feature or features being referred to are included in at least one embodiment of the technology. Separate references to "one embodiment", "an embodiment", "embodiments", "various embodiments", "certain embodiments", "some embodiments", or "other embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Broadly, embodiments of the invention are directed to analyzing vehicle make and model historical data to determine common problem trends and when common problems may arise. Previous vehicle arbitration and inspection data as well as third-party data and sensor data may be used to determine failure rates for specific items such as, for example, belts, transmissions, head gaskets, upper and lower engine noise, and any other problems that may arise that may be vehicle and part specific. The third-party data may be used to determine previous owner use and evaluate a condition of the vehicle, predict a future condition, and a rate of deterioration of a vehicle. In some embodiments, data may be gathered such as, for example, vehicle use history, vehicle registration location, geographic location of prior owners, vehicle condition information from inspections, vehicle arbitration data, engine recordings, and video data, among other data. The sensor data may be used to diagnose specific problems for a particular vehicle. The data may be analyzed to provide recommended inspection focus areas for part and vehicle specific inspections.

In some embodiments, the above-described data analysis may be used to determine a vehicle reconditioning estimate to determine time, part, and labor costs associated with reconditioning a vehicle from a wholesale condition to a retail condition. The combination of the vehicle-specific focused qualitative inspection combined with the arbitration data, the sensor data, and the external third-party data may guide the inspector and the buyer to make informed decisions. Further, the buyer may use the provided information to determine reasonable wholesale and retail prices for the vehicle.

Figure 1:
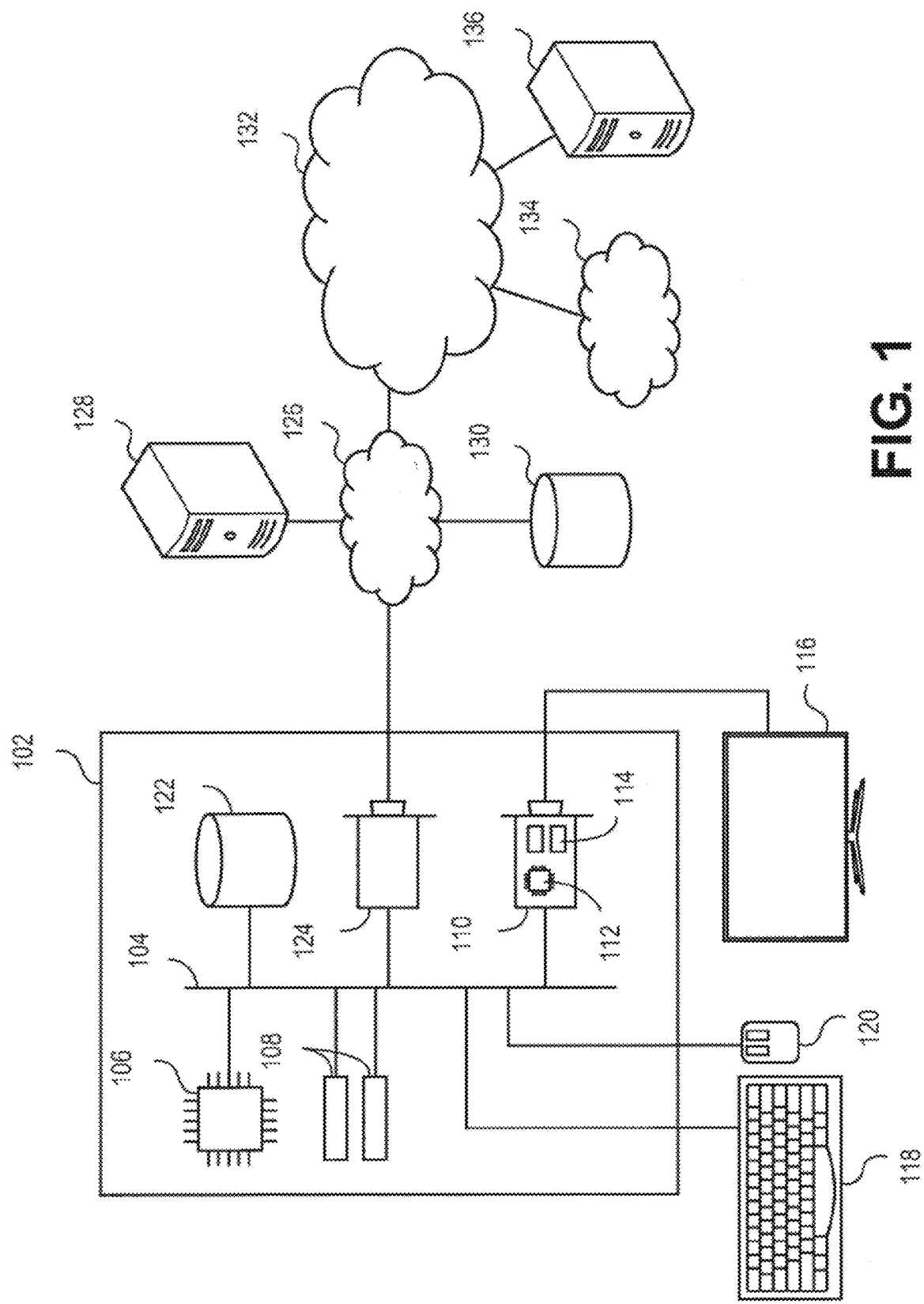
FIG. 1 depicts an exemplary hardware platform for certain embodiments of the invention.

Turning first to FIG. 1, an exemplary hardware platform that can form one element of certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also, on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media and may be internally installed in computer 102 or externally and removeably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth®, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Accumulation of Data for Focused Vehicle-Specific Inspection

Typically, a dealer may list a pre-owned vehicle for sale to another dealer. The vehicle may be listed at a wholesale condition and price such that the buying dealer may purchase the vehicle as-is, recondition the vehicle for retail, and sell the reconditioned vehicle to a consumer while making a profit. The buying dealer may inspect the vehicle to determine the condition of the vehicle and to estimate the profit that may be made. Typically, the buying dealer would be required to perform a general inspection of the vehicle, examining the entirety of the body, engine, interior, and other components of the vehicle, resulting in a laborious and time-consuming process. An automated system that analyzes historical vehicle data, determines vehicle-specific problems, and recommends focused vehicle-specific inspection can quickly determine potential problems with vehicles and reduce vehicle arbitration cases.

Figure 2:
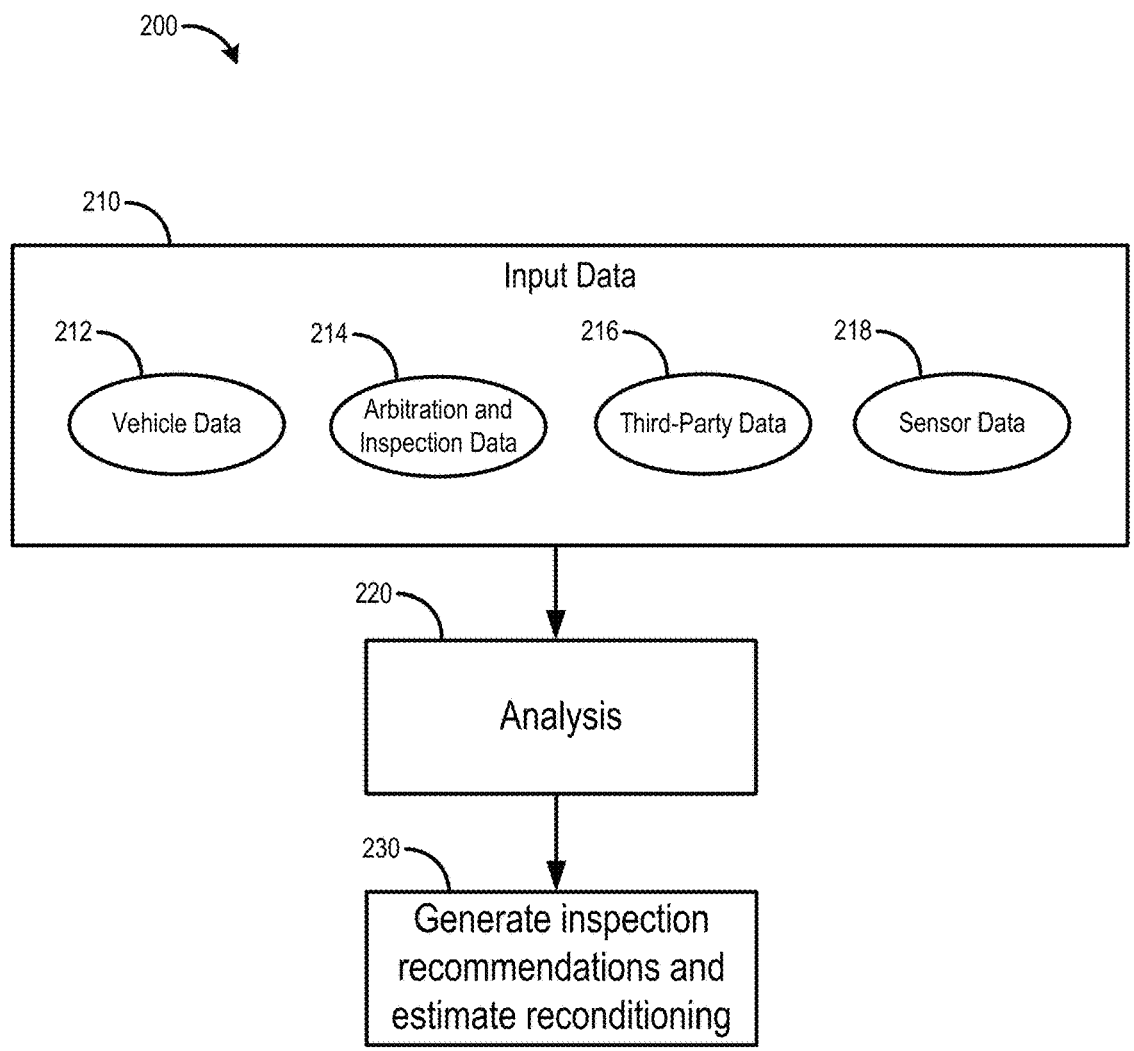
FIG. 2 depicts a flowchart illustrating the operation of the system in accordance with embodiments of the invention.

FIG. 2 depicts an exemplary process 200 of obtaining inputs 210, analyzing the data from the inputs 220, and outputting focused inspection recommendations and estimated costs of reconditioning (or reconditioning estimates) 230. In some embodiments, vehicle data 212 may be obtained by the system such that a database of information may be stored, tabulated, analyzed, and presented to a user. The vehicle data 212 that is stored may be, for example, the make and model of the vehicle, mileage, year, VIN, vehicle part identifiers or manufacturers, and any other vehicle information that may be tabulated and may be useful in determining a focused inspection recommendation for the vehicle and a reconditioning assessment of the vehicle. In some embodiments, the specific vehicle parts may be indicators of a likelihood of failure of either the specific vehicle part or of the vehicle itself. Exemplary vehicle parts that may provide likelihood of failure indicators may be the vehicle engine and transmission.

In some embodiments, data may also be gathered from vehicle arbitration and inspection (termed arbitration and inspection data 214). The data gathered may be indictive of vehicle condition, market value, retail price, wholesale price, and any other data that may be used to evaluate the condition of the vehicle and estimate reconditioning of the vehicle. The data from previous vehicle inspections and vehicle arbitration can further be utilized to determine and compile a database of vehicles and correlations between vehicles, vehicle parts, part failures, time of failures, and failure rates. The database of vehicle make and model and historical data for the vehicles may be analyzed. The vehicle arbitration and inspection data may be indicative of the condition of the vehicle, individual parts of the vehicle, or both. By way of non-limiting example, the vehicle arbitration and inspection data 214 may be the condition of previously inspected vehicles. The data from previous inspections of vehicles may be compiled in the database. The inspections of the vehicles and the arbitration of vehicles post sale may provide an ever-growing database of information that reveals trends in vehicle problems such as failure and deterioration of parts.

Typically, a pre-owned vehicle may be sold after inspection and reconditioning for retail. After, the vehicle is sold, if one or more parts of the vehicle fail, the data detailing the failure can be collected and updated in the arbitration and inspection data. When there is no arbitration, the inspection data may be accepted as correct, and the data may not be updated or may be updated with a higher confidence score. The process allows for arbitration and inspection data to be up-to-date. From the arbitration data, the structural issues (e.g., failed parts) and payout to the consumer are known. The arbitration and inspection data may be updated based on the structural issues and based on the payouts. Further, an associated cost of the payout may be determined, and future inspection reconditioning estimates may be adjusted accordingly.

In some embodiments, the inspection recommendations may be based at least in part on the cost of the parts and labor compared to the cost of potential arbitration payouts. By way of non-limiting example, if only 0.01% of head gaskets fail at 100,000, miles then there may be a low likelihood of arbitration and the potential total payout costs are low. Consequently, it may not be economically viable to the dealer to replace every head gasket for every such vehicle at 100,000 miles. However, if the number increases to 1% of head gaskets fail at over 125,000 miles, then it may be less expensive and more economically viable to replace all head gaskets at 125,000 miles for every such vehicle rather than to pay the corresponding arbitration costs. Therefore, a learning algorithm can be updated to recommend that the head gasket be replaced when the vehicle is at or above 125,000 miles, based at least in part on the rate of head gasket failures, the results of the arbitration, and the cost of replacing the head gasket, or any combination thereof.

In some embodiments, part failures and the failure rates of those parts may be tracked and associated with specific vehicle makes and models. The vehicle arbitration and inspection data may further be associated with the vehicle make and model data and compiled using any statistical, machine learning, and/or tabular methods. In some embodiments, specific parts may be associated with the vehicle make and model data. By way of non-limiting example, vehicle data indicative of a Nissan Sentra may be stored in a database. The make, model, and year of the vehicle may be associated with a particular transmission that fails at regular rates. For example, it may be determined that five percent (5%) of transmissions in Nissan Sentras fail between 70,000 miles and 80,000 miles. The five percent (5%) rate of failure at the determined mileage range may be labeled as "high risk." Focused inspection recommendations may be made based on the determined failure rating. For example, an inspector may receive a Nissan Sentra that has 75,000 miles. Based on the vehicle make and model it can be determined that the Nissan Sentra of the example has a type of transmission that has a "high risk" of failure, as described above. The inspector may be notified of the rating and may be provided instructions based on the rating. For example, the inspector may be instructed to do a thorough inspection of the transmission that may not be required when the Sentra has a mileage of 50,000 miles.

In the exemplary embodiment described above, it may be determined that the Nissan Sentra transmission fails at a regular rate. In some embodiments, the stored vehicle and arbitration and inspection data may be analyzed to determine these trends. For example, it may be determined that some vehicles may be associated with specific parts that fail at a particular rate, as with the transmission in the embodiment described above. The data analysis may be performed by accessing non-transitory computer-readable media storing computer-executable instructions that, when executed by at least one processor, perform analysis of the data to generate focused inspection guidelines and estimate reconditioning of vehicles. The data analysis may utilize decision tables, machine learning, and statistical algorithms to compare stored data associated with the vehicles arbitration and inspection data, third-party data, sensor data, as well as the vehicle data, and the vehicle history information, or any combination thereof, to determine correlations between vehicles, parts, part failures, failure rates, failures based on the historical data, deterioration based on the trends and historical data, and any other analytics that may be used to determine focused inspection recommendations and reconditioning guidelines and estimates.

In some embodiments, sensor data 218 may also be obtained from one or more sensors recording and storing sensor data 218. The sensors may be communicatively coupled to the vehicle (e.g., a device plugged into the OBD-II port) that receive diagnostic data or alternatively, may be external sensors that collect data of the vehicle. In some embodiments, the sensor data 218 may include an audio recording of the engine of the vehicle. Audio may be recorded through the use of an audio recording device, such as for example, the microphone of an inspecting user's smartphone. The recording device may record and measure the sound of the running engine. Engine noise may be recorded as well as timing. A recorded signal indicative of the recorded engine sound may be compared to a stored signal indicative of a healthy engine to determine aberrant noise that may be indicative of engine problems. The audio may be analyzed using a machine learning algorithm that is trained to detect aberrant noise that may be indicative of engine problems. Based on the analysis of the audio, it may be recommended that focused inspection of the engine is recommended. In some embodiments, the analysis may be used to estimate reconditioning of the vehicle and final retail price of the vehicle.

In some embodiments, the sensor data 218 may include a photographic or video inspection processes. Images or video may be taken of the engine, interior, exterior, and any other part of the vehicle using a camera or video recording device. By way of non-limiting example, images and video may be captured using the camera on a mobile phone. The images or video may be analyzed using a machine learning algorithm that is trained to detect indicators of vehicle body damage. For example, the vehicle may be a truck from a northwestern region of the United States known as the "salt belt." This area is known to cause vehicles to rust based on the salt-water mixture that the vehicles encounter in the winter. Based on the location of the vehicle, as described below, an undercarriage rust inspection may be recommended. An under-vehicle camera may be used to record the vehicle from under the carriage of the vehicle and in small spaces such as the wheel wells. The video recording may be analyzed for rust. The video may be analyzed using a machine learning algorithm that is trained to detect discoloration in the metal and bubbling in the paint that is indicative of rust.

In some embodiments, a machine learning algorithm may be trained to detect rust, bubbling or any other damage on the exterior and the interior of the vehicle. The algorithm may be presented with images and video of known vehicle damage and rust and learn to detect the damage and rust locations through an iterative error reduction process. Images and video of the vehicle may be taken in the inspection process and analyzed with the machine learning algorithm. The results may be stored in the arbitration and inspection for future comparisons and algorithm training. Further, the data may be used to estimate reconditioning and a final retail price of the vehicle.

In some embodiments, the sensor data 218 may include testing and analysis of the vehicle emissions. Samples of the emissions may be collected and analyzed. The analysis of the samples may be used to recommend inspection of the engine, exhaust, or other part of the vehicle. For example, if the analysis of the emission indicates a higher-than-acceptable level of carbon monoxide (thereby indicating incomplete fuel combustion), an inspection of the engine may be recommended. The results may be stored in the arbitration and inspection for future comparisons and algorithm training. In some embodiments, the analysis of the emissions sample may be stored and used to estimate reconditioning and final retail price of the vehicle.

In some embodiments, the sensor data 218 may include a tactile inspection of the vehicle using a physical inspection of the vehicle or through a surface-measuring device. For example, an inspector may go over the exterior body of the vehicle with a surface-measuring device. The surface-measuring device may shine light on the surface of the body of the vehicle and analyze the surface based on the reflected signal, thereby capturing the condition of the vehicle including any scratches, dents, frame warping, or other imperfections. The data captured by the surface-measuring device may be analyzed using a machine learning algorithm that is trained to detect underlying vehicle damage that is indicative of exterior body damage. Data indicative of the exterior of the vehicle being damaged may be indicative of further and additional damage to the frame, chassis, or other parts of the vehicle. It may be recommended that based at least in part on the tactile inspection and data collected that further inspection of the frame of the vehicle. The results may be stored in the arbitration and inspection for future comparisons and algorithm training. Additionally, in some embodiments, the analysis of the tactile data may be stored and used to estimate reconditioning and final retail price of the vehicle.

In some embodiments, sensor data 218 may be diagnostic data that is obtained and stored by accessing the electronic vehicle management system via a diagnostic port (e.g., an OBD-II port) of the vehicle. The diagnostic data that is stored may be, for example, real time parameters, status of the "check engine" light, emission readiness status, diagnostic trouble codes, oxygen sensor test results, VIN, and number of ignition cycles and other data stored on the on-board diagnostics of the vehicle. The diagnostics data may be analyzed and be used in generating the focused inspection recommendations and reconditioning estimates.

In some embodiments, the vehicle information may include accident and vehicle history data obtained from third-party sites (e.g., AutoCheck® and CARFAX™) which may comprise third-party data 216. The vehicle history data may include any registration information, maintenance history, location history, location of prior owners, registration locations, accident history, and any other historical data that may be useful for inspections and reconditioning. The data from third-party sources may be analyzed with the vehicle data, inspection and arbitration data, or sensor data as described above, or any combination thereof and be factored in the determination of the focused inspection recommendation. In some embodiments, the location data of the vehicle may be important in evaluation of the vehicle for recommending a focused inspection and estimating reconditioning. Many location-based factors may cause deterioration of parts of the vehicle. For example, salt from colder climates and coastal regions may cause rust. Similarly, ultraviolet rays in hot desert environments may cause interior deterioration and discoloration. These examples are not intended to be exhaustive, as location-based factors may cause any number of deterioration of parts of the vehicle.

In an exemplary scenario, a truck may arrive at a dealership on trade-in. The vehicle historical data obtained from a third-party site may indicate that the truck was owned in the "salt belt," as described above. Because of the region that the truck was registered, a higher likelihood of rust may be determined. Based on the region and the higher likelihood of rust, a recommendation to inspect the interior of the body and frame of the truck for rust can be provided to the inspector. The rust inspection may be visual and may utilize the video and images analysis as described in embodiments above. Alternatively, the rust inspection may be tactile and may utilize a surface-measuring device as described in the embodiments above.

In some embodiments, a likelihood of failure of at least one part of the vehicle, or of the vehicle itself, may further be determined. A likelihood of failure of a part may be determined based on the inspection and arbitration data, from the history of vehicles of the same make and model, from the vehicle history of the selected vehicle, from the sensor data, and from the third-party data, or any combination thereof. From the historical data (e.g., vehicle history, arbitration and inspection data, third-party data), it may be determined that a particular part fails with a regular frequency. Based on the historical data, a likelihood that the given part may fail within a given timeframe after selling the vehicle to a potential customer may be determined. If the likelihood is higher than a pre-determined threshold, a recommendation to replace the part may be presented. Further, the part replacement cost may be included in the reconditioning cost described below.

In some embodiments, a score may be applied to a vehicle or part based at least in part on the analysis of the data inputs as described in the embodiments above. For example, the likelihood of failure of a part may be given a numerical score, such as a score from 1-100. A score from 1-33 may indicate to the inspector that the part is at a low risk of likelihood of failure. A score from 34-66 may indicate to the inspector that the part is at a medium risk of likelihood of failure. A score from 67-100 may indicate to the inspector that the part is at a high risk of likelihood of failure. Focused inspection recommendations may be provided based on the scores of the parts. Alternatively, any scoring system may be used and presented to the inspector. In some embodiments, high, medium, and low risk scoring options may be provided, and focused inspection recommendations may be provided based at least in part on the determined scores. In some embodiments, binary options may be present such as, for example, inspect/don't inspect. In some embodiments, a color-coded system may be present such as, for example, a green, yellow, red system indicating low, medium, and high risk, respectively.

In some embodiments, the focused inspection recommendations may be provided based on the determined scores.

For example, the recommendation to inspect may be provided if the likelihood of failure is above 0.1 or any other number that is determined to be a reasonable rate of failure. In some embodiments, the likelihood failure may be a likelihood that the part will fail in the next 1,000, 5,000, 10,000 miles, or any other mileage range. Further, the next recommended inspection of the vehicle may be based at least in part on the mileage range.

In some embodiments, the range to determine the likelihood of failure may also be based on time. For example, it may be recommended that a Nissan Sentra receives regular maintenance every 10,000 miles or 6 months, whichever comes first. The timeline to determine a likelihood of failure may correspond to both the 10,000 miles and the 6-month timeline.

In some embodiments, focused inspection recommendations may be based on likelihood of failure and cost of replacement. As described above, the cost of arbitration may be compared to the cost of replacement to determine a minimal cost to the dealer. Further, customer satisfaction numbers may be included as constraints to optimize cost vs customer satisfaction.

In some embodiments, linear and nonlinear optimization programs may be used to optimize for the desired output. Further, the statistical and machine learning algorithms may also be used to optimize for the desired output. For example, an optimization program may be used to determine the lowest cost of arbitration versus part replacement in inspection while maintaining a minimum level of customer satisfaction. The customer satisfaction may be obtained by questionnaires and included in the arbitration and inspection data. The focused inspection recommendation and the reconditioning estimate may be based on the results of the optimization program. Further, any of the processes and data analysis described herein may be processed using any known mathematical method to achieve the desired output.

In some embodiments, different levels of inspection may be recommended. For example, a low likelihood (e.g., 0-0.1, 1-33, green) of failure may result in no additional focused inspection recommendation and instead, only the standard general inspection is recommended. A medium likelihood (e.g., 0.1-0.2, 34-66, yellow) of failure may result in a more focused inspection recommendation of a particular part or component of the vehicle. A high likelihood (e.g., above 0.2, 67-100, red) of failure may result in a very focused inspection recommendation of a particular part or component of the vehicle. For example, a transmission may typically fail for a particular vehicle around 100,000 miles. At 80,000 miles the transmission is rated with a medium likelihood for failure. An additional transmission driving inspection may be recommended for the inspector to drive the vehicle and shift between gears while listening and feeling for lag or other aberrations. Similarly, at 100,000 miles a high likelihood of failure is determined from comparison of the data inputs described above. An additional, more thorough inspection of the transmission may be recommended. The inspector may remove the transmission and perform a closer inspection of the gears and measure the amount of deterioration to determine if the transmission needs repaired or replaced.

Any risk level, numbering system, likelihood of failure, or any combination thereof may be determined and presented to the inspector for vehicle-specific focused inspection recommendations. For example, due to the age and mileage of a vehicle, it may be determined that the transmission is a "medium risk" of a likelihood of failure. The determined focused inspection recommendations of a "medium risk" vehicle may be of a lower level of focused inspection of the transmission than that of the focused inspection recommendation of a vehicle having a "high risk" of a likelihood of failure of the transmission. In some embodiments, no rating levels or focused inspection recommendations are provided and only recommendations for general inspection may be presented to the inspector.

It is common for dealers and sellers of vehicles to provide warranties or guarantees for certain vehicles or for certain parts. Such guarantees may be provided in the form of a promise that a certain part will continue functioning for a certain period of time or for a certain mileage range. In some embodiments, guarantees for vehicles and parts may be determined based on the vehicle data, arbitration and inspection data, the third-party data, and the sensor data, or any combination thereof. For example, guarantees may be provided for recently repaired parts or for parts that are determined to be at a low risk of likelihood of failure. Alternatively, guarantees may not be provided when a part of a vehicle is reaching a likely end or is determined to be at a high risk of a likelihood of failure. The guarantees may be based at least in part on the likelihood of failure of a pre-existing part or a replacement part.

In some embodiments, the data inputs (e.g., vehicle history, inspection and arbitration data, third-party data, and sensor data), and focused inspection recommendations may be presented to the inspector by a user interface accessible by any monitor associated with the computerized system described in FIG. 1. Further, the likelihood of failures, ratings, scores, focused, inspection recommendations, and step-by-step instructions for performing the inspections may likewise be provided to the inspector by the user interface. In some embodiments, the user interface may be displayed on a computing device, the computerized system may be any form of computing devices discussed above with respect to FIG. 1, including but not limited to a desktop computer laptop computer, server computer, a mobile device such as a smartphone or tablet.

In some embodiments, the computing device may further house at least one sensor for receiving and storing the sensor data in the embodiments described above. For example, the computing device may comprise at least one microphone for recording the sound the engine. The recorded signal may then be compared to a stored signal indicative of a healthy in the manner described in the above embodiment. In some embodiments, the computing device may comprise at least one camera to perform the image and video inspection process in the manner described in the above embodiment. In some embodiments, the computing device may be communicatively coupled to vehicle to receive the diagnostic data. For example, the computing device may be physically connected to the vehicle via a diagnostic port (e.g., and OBD-II port) to access the electronic vehicle management system. Alternatively, the computing device be wirelessly coupled to the electronic vehicle management system (e.g., Bluetooth®).

Reconditioning Estimation

In some embodiments, the above-described data and analysis may further be used to estimate the cost of reconditioning the vehicle and provide reconditioning estimates to take the vehicle from wholesale condition to retail condition. In some embodiments, the vehicle data, arbitration and inspection data, third-party data, sensor data, and the focused vehicle-specific inspection data is analyzed and used to determine the reconditioning estimate. The reconditioning estimate may be used by a dealer buyer to determine if the purchase price of the vehicle compared to an estimated retail price will be profitable. The dealer buyer may then decide if it is worth it to purchase the vehicle. In some embodiments, the above-described data inputs are combined to generate a reconditioning estimate. The cost of part replacement may be based at least in part on the likelihood of failure of the part as well as labor associated with the part replacement. The reconditioning estimate may be determined based on the analysis of the data inputs as described in the embodiments above.

In some embodiments, the reconditioning cost may be estimated before the focused inspection and the focused inspection cost may be included in the reconditioning cost. The pre-inspection reconditioning cost may be a preliminary estimate based at least in part on the vehicle data, the arbitration and inspection data, the third-party data, and the sensor data, or any combination thereof. The pre-inspection reconditioning cost may be a preliminary estimate to determine if the vehicle is worth performing the focused inspection to gain more information and a more accurate estimation.

In some embodiments, when the focused inspection is recommended and conducted, the reconditioning estimate may further be based in part on the results of the focused inspection. The focused inspection may provide vehicle-specific details such as, for example, parts and labor costs that contribute to the overall reconditioning cost. Inclusion of the focused inspection results may provide a more accurate estimate of the reconditioning cost for evaluation and determination of a final estimated profit from sale of the vehicle.

In some embodiments, the system may automatically evaluate the vehicle using information obtained during the wholesale transfer, the estimated cost of reconditioning, and the current market value of the vehicle. The current market value may be calculated from scraping websites and determining similar make and model sale prices or from recent sales of the same vehicle types. The buying price of the vehicle may be known, and the reconditioning estimate may be determined from the focused inspection. The difference may be determined between the estimated sale price based on the current market and the sum of the purchase price and reconditioning estimate. An accurate profit may be calculated, providing the dealer with information to make an informed decision. Any of the statistical, machine learning, and optimization algorithms described above may be used in determining the reconditioning estimate and a final profit based on the vehicle data, the arbitration and inspection data, the third-party data, the sensor data, and the focused inspection data, or any combination thereof.

In some embodiments, the reconditioning estimates may be provided to a third-party dealer such that the third party may make an informed purchasing decision. The third party may receive the pre-inspection estimate or, in some embodiments, the third-party may perform their own inspections. The third party may provide data indicative of the third-party inspection and reconditioning estimates may be based at least in part on the results of the third-party inspections.

In some embodiments, the third party may be a consumer and the inspection recommendations and reconditioning parts, and estimates may be provided to the consumer in a direct-to-consumer sale. The vehicle may be purchased by the dealer and provided to the consumer at a marked-up cost but well below retail value. The consumer may purchase the vehicle from the dealer at a low cost and perform the reconditioning. This provides the consumer with a low-cost option for the vehicles and saves the dealer the time and cost of reconditioning and advertising.

In some embodiments, the reconditioning estimates may be provided to a reconditioning service provider such that the dealer and reconditioning service provider have a baseline to negotiate the cost of reconditioning the vehicle. The reconditioning service prover may receive the reconditioning estimate and can accept the reconditioning estimate and perform the reconditioning services. Alternatively, if the reconditioning service provider does not accept the reconditioning estimate the reconditioning service provider and the dealer can negotiate a price for reconditioning.

Figure 3:
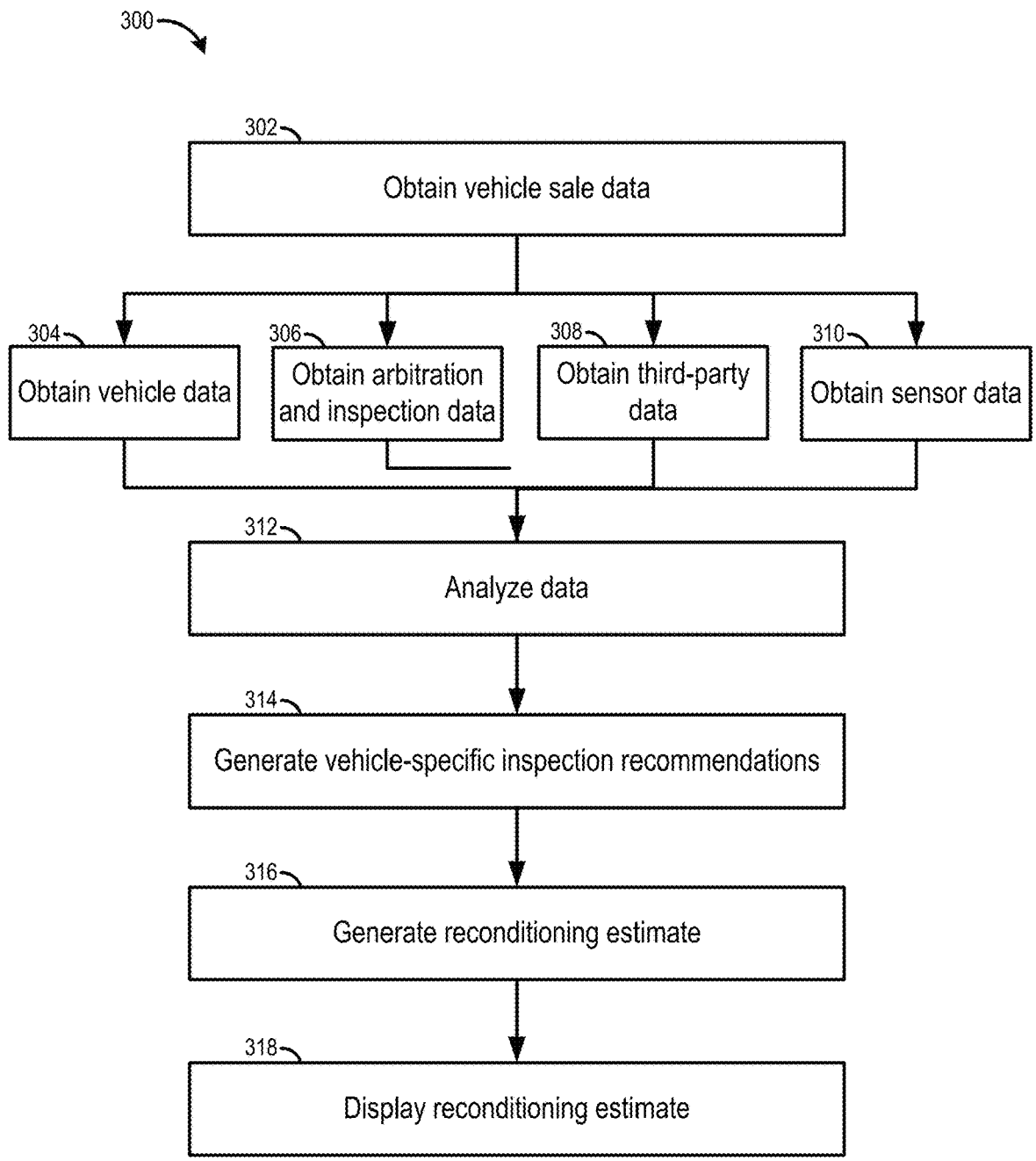
FIG. 3 depicts a flow chart illustrating the operation of the system in accordance with embodiments of the invention.

FIG. 3 depicts an exemplary method of analyzing historical vehicle data, arbitration and inspection data, third-party data, and sensor data and generating focused inspection recommendations and the estimated cost of reconditioning generally referenced by numeral 300. At step 302, data is obtained about a vehicle in a dealer-to-dealer transaction. For example, the vehicle may be for sale by a dealer seller to a dealer buyer at a wholesale price. The vehicle may not be in an appropriate condition for resale to a consumer as described in embodiments above and may require reconditioning or focused inspection.

At step 304, the vehicle data may be obtained. The vehicle data may be any information specifically related to the vehicle such as, for example, the make and model, production year, VIN, color, general condition, and any other information that may be associated with the vehicle. The vehicle data may be stored in a table along with the arbitration and inspection data, the third-party data, the sensor data, the focused inspection data, and the reconditioning estimate data, or any combination thereof.

At step 306, the arbitration and inspection data associated with the vehicle make and model may be obtained. The arbitration and inspection data may be stored historical data associated with the make and model of the vehicle. For example, parts, recalls, part failure, part failure rate, arbitration costs and payouts, and any other data that may be associated with the make and model of the vehicle and indicative of maintenance and reconditioning costs may be stored. The arbitration and inspection data may be stored in a table along with the vehicle data, the third-party data, the sensor data, the focused inspection data, and the reconditioning estimate data or any combination thereof.

At step 308, the third-party data may be obtained. The third-party data may be data indictive of the history of the vehicle. For example, vehicle ownership, registration location, owner location, purchase location, accident history, and any other data indicative of the history of the vehicle may be stored. The third-party data may be stored in a table along with the vehicle data, the arbitration and inspection data, the sensor data, the focused inspection data, and the reconditioning estimate data or any combination thereof.

At step 310, the sensor data may be obtained. The sensor data may be data received through one or more sensors and may be indicative of the current condition of the vehicle. For example, the sensor data may be audio recordings of the sound of the engine. Additionally, the sensor data may be recorded images or videos of the body work of the vehicle. Further, the sensor data may be scratches, dents, or other body imperfections recorded through a surface-measuring device (such as an optical surface scanner). Even further, the sensor data may be the analysis of the testing of emission samples taken from the exhaust of the vehicle. The sensor data may be stored in a table along with the vehicle data, the arbitration and inspection data, the focused inspection data, and the reconditioning data, or any combination thereof.

At step 312, the above-described data may be analyzed to determine correlations and failure trends. The vehicle data, arbitration and inspection data, the third-party data, and the sensor data may be combined and analyzed to determine a likelihood of failures and deterioration of parts, paint, interior, exterior, and any other conditions that may lead to repair of the vehicle. Any algorithms described in embodiments above may be used to analyze and compare the data inputs.

At step 314, focused inspection recommendations may be generated and presented to the inspector. The focused inspection recommendations may be based at least in part on the data analysis described in embodiments above. The focused inspection recommendations may provide inspection points in addition to, or in replace of, the general inspection. The additional inspection points may be directed toward likely deterioration and failure points of the vehicle based on the above-described analysis. The focused inspection may provide a thorough vehicle-specific inspection recommendation, including step-by-step instructions, based on likely deterioration and failure of parts of the vehicle.

At step 316, the reconditioning estimate may be generated. In some embodiments, the pre-inspection reconditioning estimate may be generated prior to the focused inspection. The pre-inspection reconditioning estimate may be a preliminary estimate based on the vehicle data, the arbitration and inspection data, the sensor data, and the third-party data. In some embodiments, the reconditioning estimate includes the focused inspection data and provides a more accurate estimate based on the focused inspection of the vehicle.

At step 318, the focused inspection recommendation, the reconditioning estimate, or both may be displayed by the user interface on the computing device as in the embodiments above. For example, the focused inspection recommendation may be displayed as an inspection checklist of parts that require further inspection. In some embodiments, the focused inspection recommendation may simply indicate that no further inspection is required.

Figure 4:
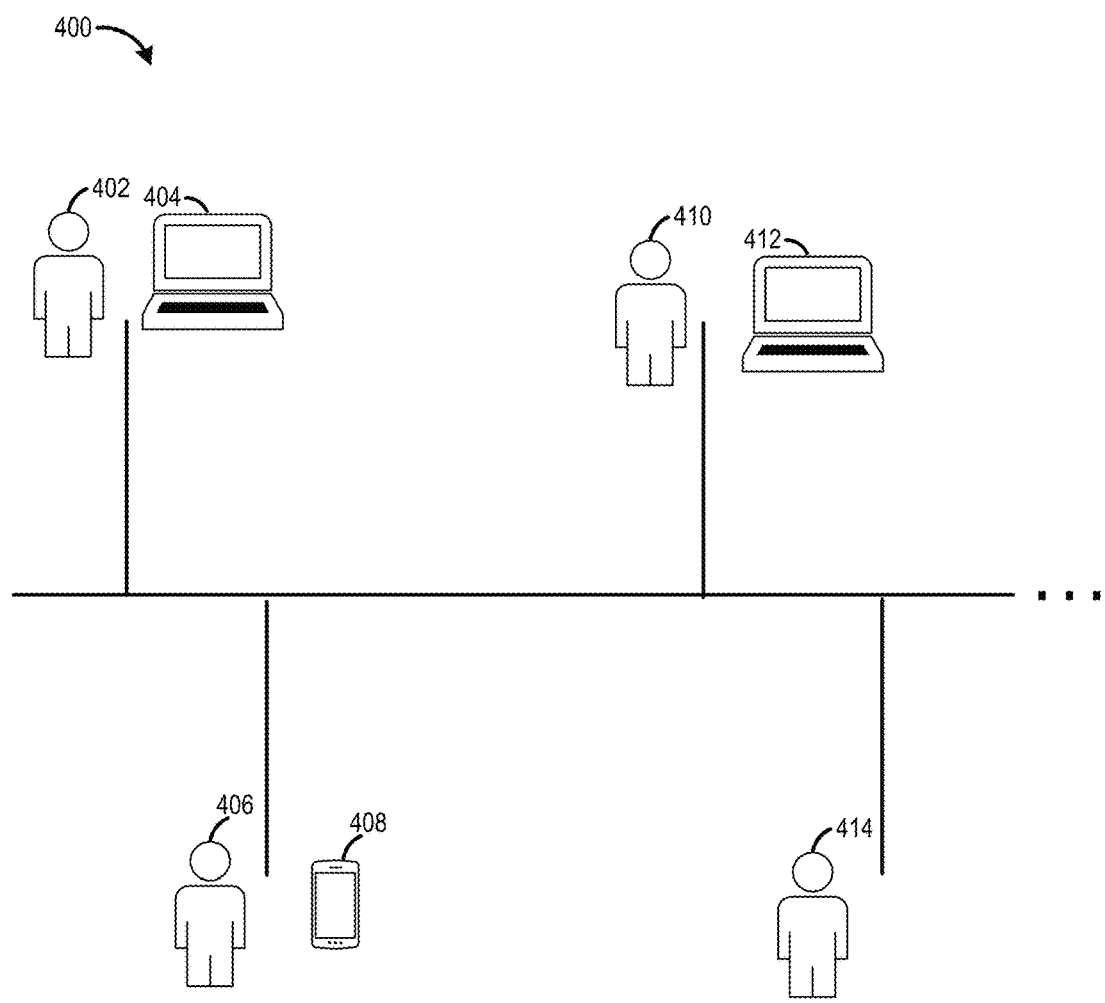
FIG. 4 depicts a system figure illustrating the elements of a system for carrying out embodiments of the invention.

FIG. 4 depicts an exemplary system figure illustrating the elements of a system for carrying out embodiments of the invention as depicted and referred to generally by reference numeral 400. System 400 generally depicts a system for multiple users using computing devices programmed with the user interface as described in the embodiments above. As depicted in FIG. 4, the computing devices may be any form of computing devices discussed above with respect to FIG. 1. In particular, a user may access the user interface using a desktop, a laptop, or a mobile device. The system may be accessible via dedicated software of the computing device or via the web browser of the computing device.

Turning to FIG. 4, dealer seller 402, using device 404 programmed with the user interface, offers for sale a pre-owned vehicle to dealer buyer 406 (via device 408). Using device 408 programmed with the user interface, dealer buyer 406 may review the focused inspection recommendation and estimated cost of reconditioning as determined by device 408. Relying at least in part on the focused inspection recommendation, the estimated cost of reconditioning, or both, dealer buyer 406 may then choose to purchase the vehicle from dealer seller 402 (via device 404) at a wholesale price, negotiate for a different price, or reject dealer seller's 402 offer of sale.

If dealer buyer chooses to purchase the vehicle, then after purchasing the vehicle, dealer buyer 406 may communicate with one or more reconditioning service providers 410 for reconditioning the vehicle to a retail condition. In some embodiments, dealer buyer 406 may communicate with reconditioning service provider 410 prior to performing the recommended focused inspection or alternatively, no focused inspection is performed either by choice of the dealer buyer 408 or because focused inspection is not recommended by the system. In some embodiments, dealer buyer 406 may communicate with reconditioning service provider 410 after performing the recommended focused inspection. As depicted in FIG. 4, in one embodiment dealer buyer 406 can communicate with reconditioning service provider's device 412 via electronic communication between dealer buyer's device 408 and reconditioning service provider's device 412. In the exemplary embodiment, the user interface is programmed into reconditioning service provider's device 412. Via the user interface, the determined estimated reconditioning cost, focused inspection recommendation, and other information of the vehicle can be transmitted to reconditioning service provider's device 412. After receipt of the estimated reconditioning cost, reconditioning service provider 410 can accept the estimated cost of reconditioning, negotiate a different cost for reconditioning the vehicle, or reject reconditioning the vehicle. If dealer buyer 406 and reconditioning service provider 410 are unable to reach an agreement on the cost of reconditioning, dealer buyer 406 can begin the process again and communicate with another reconditioning service provider.

After reconditioning the vehicle, or otherwise determining the vehicle is ready to be sold at retail, dealer buyer 408 may then communicate with one or more consumers 414 and offer the vehicle for sale at retail price.

Each computing device used by the users in the system may be communicatively coupled together via network 416. Network 416 may be a local area network (LAN), wide-area network (WAN), virtual private network (VPN), or the Internet. Broadly speaking, any type of network for providing communication between the various components of system 400 is contemplated.

Figure 5A:
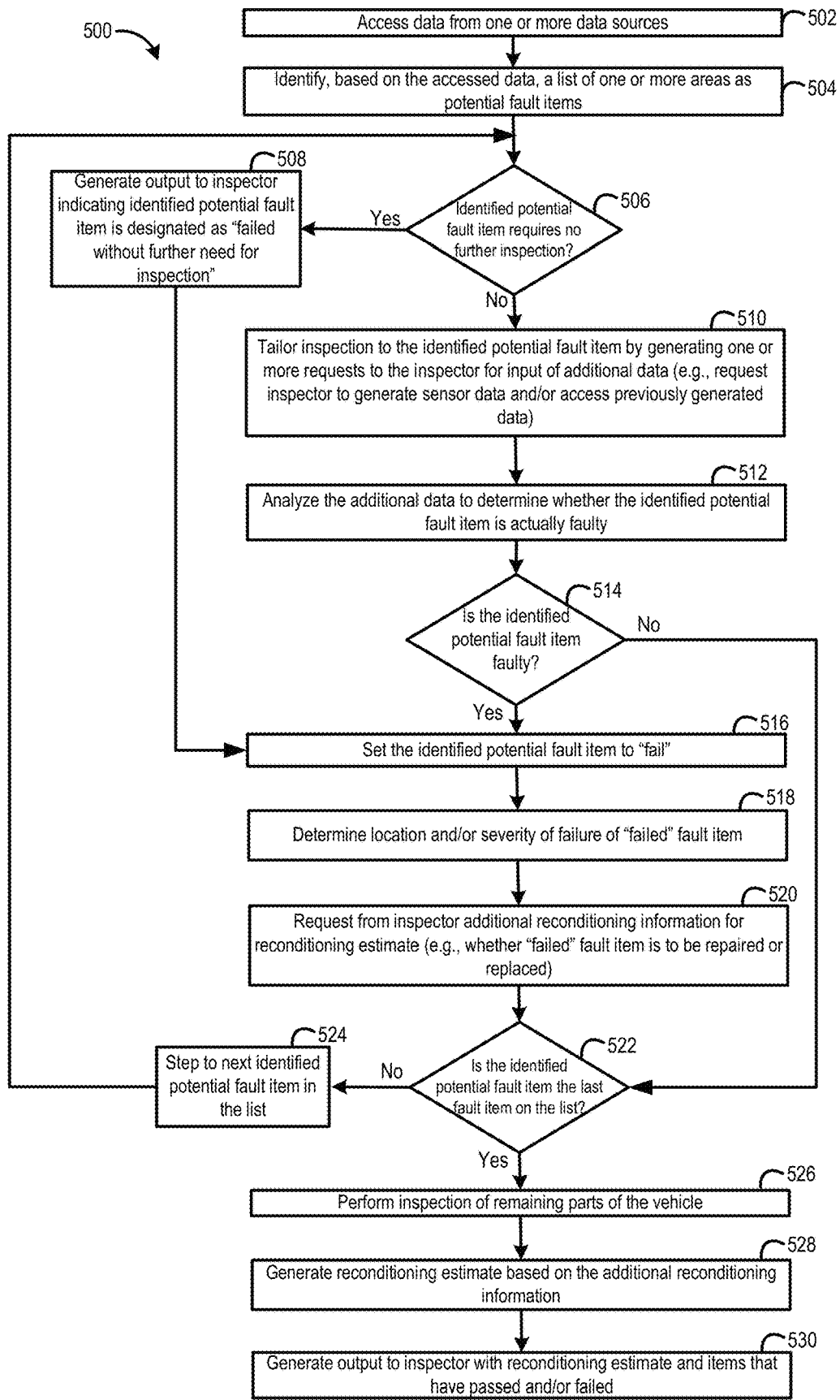
FIG. 5A illustrates a flow chart of tailoring the inspection to identified potential fault items and obtaining reconditioning information for determined fault items.

FIG. 5A illustrates a flow chart 500 of tailoring the inspection to identified potential fault items and obtaining reconditioning information for determined fault items. At 502, data is accessed from one or more data sources. As discussed above, various sources of data may be accessed. Merely by way of example, the sources of data may comprise any one, any combination, or all of: general vehicle data (e.g., any one, any combination, or all of: make; model; production year; recall information; part failure rates; etc.); specific vehicle data (e.g., any one, any combination, or all of: vehicle ownership; registration location of the vehicle; location where the vehicle resides; current location of the vehicle; or accident history (e.g., AutoCheck® and CARFAX™); sensor data (e.g., any one, any combination, or all of: sensor data generated by the vehicle itself (such as obtained via an OBD port or wirelessly communicated from the vehicle); sensor data obtained via a separate sensor from the vehicle (e.g., an image sensor to obtain images (e.g., camera on the smartphone that further executes the inspection program software); a sound sensor (e.g., a microphone on the smartphone that further executes the inspection program software) to obtain sound data (e.g., engine data) regarding the vehicle). Further, in one or some embodiments, the smartphone executing the inspection program accesses the one or more data sources. Alternatively, a server may access the one or more data sources.

At 504, a list of one or more areas as potential fault items is identified. Generally speaking, the inspection program may generate a standard list of potential fault items regardless of the specifics of the vehicle. For example, the standard list of potential fault items may be directed to typical wear-and-tear on the vehicle (e.g., the condition of the interior of the vehicle, such as tears in the upholstery; the condition of the exterior of the vehicle, such as scratches or dents; the condition of the tire tread). Separate from the standard list of potential fault items, the data from the one or more data sources, which comprises data directed to one or more aspects of the vehicle, may be used in order to identify one or more potential fault items specific to the vehicle. The inspection program may use a set of rules, data structures, or the like to determine, based on the data from the one or more data sources, whether to identify the one or more potential fault items.

As discussed above, the data sources may be indirectly related to the vehicle itself, such as failure rates of vehicles similar or identical to the vehicle subject to the inspection (e.g., the vehicle under inspection is a 2016 Nissan Rogue with failure rates for 2016 Nissan Rogues being analyzed) and/or the data sources may be directly related to the vehicle itself, such as history of the vehicle (e.g., maintenance history of the vehicle; location history of the vehicle (such as where the vehicle has been located during its use); accident history of the vehicle; etc.). In this way, the inspection program, separate from the standard points of inspection, may generate one or more tailored points of inspection guided based on the specifics of the vehicle itself.

Merely by way of example, location-based factors, alone or in combination with one or more other factors, may be used be generate the tailored points of inspection. As discussed above, the location of the vehicle, such as where the vehicle resides, may be used highlight one or more potential fault items for further scrutiny, In particular, salt from colder climates and coastal regions may cause rust. As such, the inspection program may correlate the location of the vehicle with heightened scrutiny, such as triggering a rust inspection protocol (e.g., a focused inspection for vehicles suspected of potentially having rust, including additional scrutiny of parts of the undercarriage).

At 506, it is determined whether the identified potential fault item requires no further inspection. As discussed above, the inspection program may use rules in order to identify the potential fault items in the vehicle. Certain rules may identify a specific fault item, which the inspection program tags as not requiring further inspection by the inspector (e.g., a transmission from a certain make/model/year is automatically designated as having failed due to an associated failure rate higher than a predetermined amount). In such instances, the identified specific fault item may have such a high probability of failure as to avoid the need for further analysis by the inspector, and as such, at 508, an output is generated to the inspector indicating the identified potential fault item is designated as "failed without further need for inspection", and flow chart 500 goes to 516 to designate the identified potential fault item as "failed". In this regard, the inspection program may identify items for inspection that are directed to any one, any combination, or all of: (1) fault items designated as "failed" without any inspector input; (2) fault items identified as requiring inspector input in order to be designated as failed; or (3) standard items not tagged as requiring special attention by the inspector but requiring review by the inspector.

If not, flow chart 500 goes to 510, which tailors the inspection to the identified potential fault item by generating one or more requests to the inspector for additional data. As discussed above, the inspector may be requested to generate additional sensor data (e.g., obtain images from the camera on the smartphone of designated parts and/or at designated angles for automatic analysis by the smartphone; obtain images from the camera on the smartphone for inclusion in an inspection report; obtain videos of operations of the vehicle). In order to assist the inspector to obtain the additional data, the inspection program may generate one or more outputs. In one or some embodiments, the one or more outputs may comprise a graphic of the potential fault item with at least a portion of the graphic color-modified in order to instruct the inspector to perform a visual examination of the potential fault item associated with the portion of the graphic color-modified. For example, in the case of potential rust due to the location of the vehicle, the color-modified graphic may highlight in red different parts of the vehicle (e.g., rocker panels and/or cab corners) that merit special attention. In one or some embodiments, the color-modified graphic is pre-generated. For example, in the case of potential rust, the color-modified graphic highlighting in red the different parts of the vehicle may be pre-generated. Alternatively, the color-modified graphic may be dynamically generated, with the red being dynamically added to highlighting the different parts of the vehicle.

At 512, the additional data input by the inspector may be analyzed in order to determine whether the identified potential fault item is actually faulty. As discussed above, the analysis may comprise any one of: (1) fully automatic analysis of the additional data (e.g., the smartphone automatically analyzes the images of designated parts to determine whether the designated parts have failed); (2) fully manual analysis of the additional data (e.g., the inspector, without any input from the smartphone, analyzes the images of designated parts to determine whether the designated parts have failed); or (3) automatic/manual analysis of the additional data (e.g., the smartphone and the inspector work in combination to identify the designated parts as having failed including the smartphone performing the analysis identifying the type of failure and/or location of failure and requesting the inspector to confirm. If the identified potential fault item is not determined to be faulty, flow chart 500 moves to 522. If so, at 516, the identified fault item is set to "fail". Optionally at 518, the location and/or severity of the failure of the "failed" fault item is determined and at 520, the inspector is requested to obtain additional reconditioning information for a reconditioning estimate. For example, reconditioning may involve either repairing or replacing the "failed" fault item. As such, the reconditioning information may comprise a conclusion by the inspector as to whether the "failed" fault item should be repaired or replaced. Alternatively, or in addition, the reconditioning information may comprise information used by someone other than the inspector (e.g., a mechanic) to determine whether the "failed" fault item should be repaired or replaced.

At 522, the inspection program determines whether the identified potential fault item is the last fault item in the list (e.g., generated at 504). If not, at 524, the inspection program steps to the next identified fault item in the list, with the flow chart 500 looping back to 506. If yes, at 526, the inspection program performs the standard inspection of the remaining parts of the vehicle, at 528, generates a reconditioning estimate based on the additional reconditioning information (e.g., obtained at 520), and at 530, generates an output (e.g., one or more GUIs) to the inspector with the reconditioning estimate and/or the item(s) that have passed and/or failed the inspection.

As discussed above, the inspection program is configured to guide the inspector in order to obtain information to evaluate whether a fault is present in the vehicle. In one or some embodiments, the inspection program may present an iterative back-and-forth with the inspector in order to solicit input for the evaluation. In particular, the inspection program may request input (such as an image, a video, an audio recording, or the like). Responsive to receiving the input, the inspection program (either locally at the smartphone and/or remotely at a backend server) may analyze in real time the requested input. Responsive to the analysis, the inspection program may request further input from the inspector (e.g., one or both of additional image, video or audio data, and/or providing responses or elections to presented questions). In this way, the inspection program may, in effect, request and receive inspector input in an iterative manner for a variety of features associated with the vehicle, such as mechanical features (e.g., the engine, discussed further with regard to FIG. 5D) and/or non-mechanical features (e.g., identifying rust in body panels, discussed further with regard to FIG. 5C).

Figure 5B:
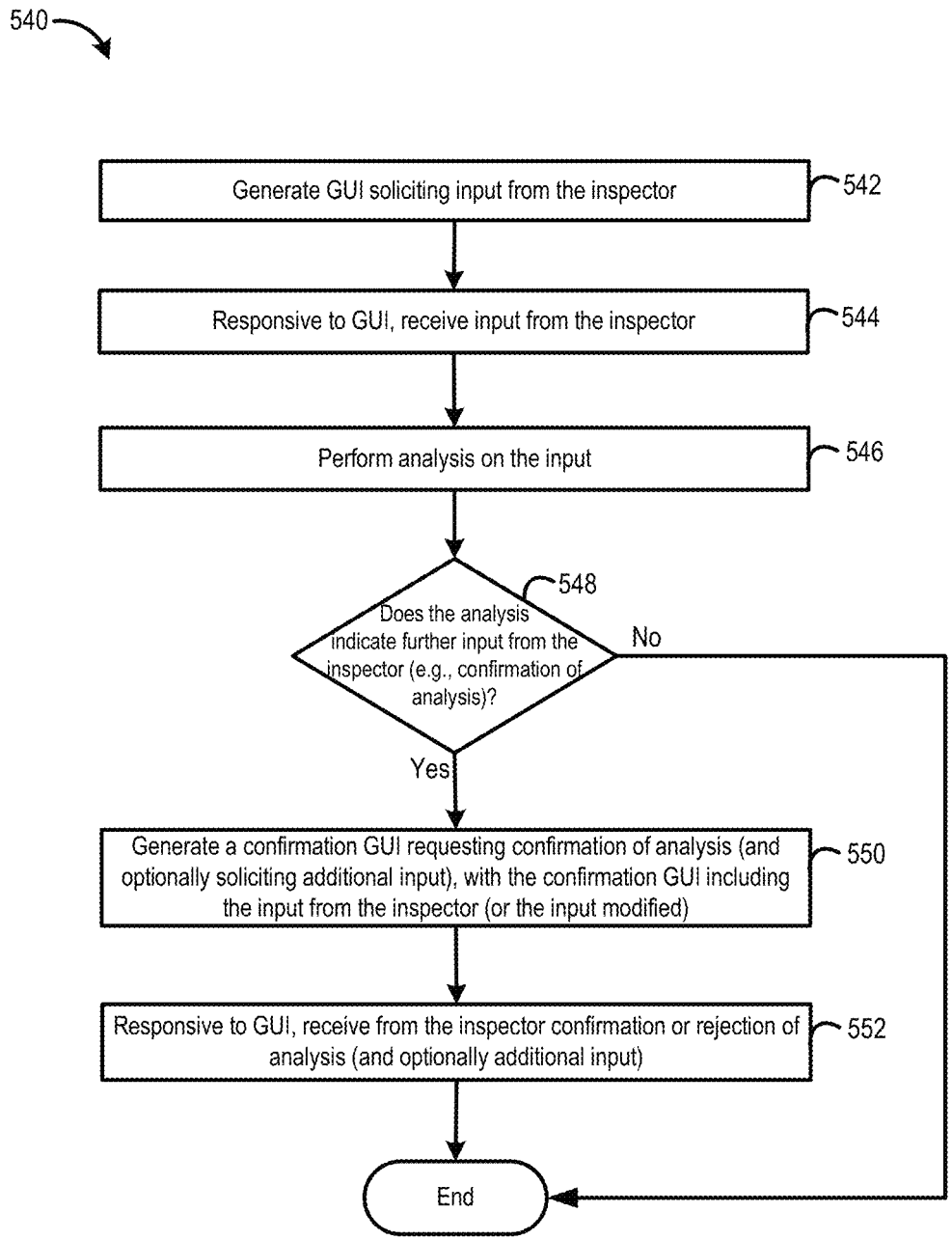
FIG. 5B illustrates a flow chart of generating a GUI to solicit input from the inspector, performing analysis on the solicited input, and requesting further input from the inspector based on analysis of the solicited input.

Merely by way of example, FIG. 5B illustrates a flow chart 540 of generating a GUI to solicit input from the inspector, performing analysis on the solicited input, and requesting further input from the inspector based on analysis of the solicited input. At 542, the inspection program generates a graphical user interface (GUI) to solicit input from the inspector. In one embodiment, the inspection program may trigger generating the GUI based on analysis of one or more data sources, as discussed above (e.g., as discussed further below, analysis of the one or more data sources may indicate a higher likelihood of rust in the vehicle, thereby triggering the inspection program to generate one or more GUIs to solicit input from the inspector to evaluate whether rust is present in the vehicle). In this way, the inspector may be presented with a more limited set of requests, tailored to the identified potential faults of the vehicle. Alternatively, the inspection program generates the GUIs based on a predetermined sequence regardless of analysis of the one or more data sources.

At 544, responsive to generating the GUIs, the inspection program receives the input from the inspector. As discussed herein, various inputs are contemplated, including any one, any combination, or all of: images; videos; audios; etc. At 545, the inspection program may analyze the input, which may indicate one or more anomalies. At 548, the inspection program determines whether the analysis indicates whether further input from the inspector is warranted. For example, responsive to the analysis identifying one or more anomalies (which may be indicative of one or more faults), the inspection program may request further input from the inspector (e.g., confirmation of the analysis and/or further input from the inspector). If not, flow chart 540 ends. If so, at 550, the inspection program generates a confirmation GUI requesting confirmation of analysis (and optionally soliciting additional input). In one or some embodiments, the confirmation GUI may include the input previously provided from the inspector (e.g., the audio previously input, see FIG. 8) and/or may include the input provided from the inspector with one or more modifications (e.g., the image previously input with one or more highlights). At 552, responsive to generating the GUI, the inspection program receives from the inspector confirmation or rejection of analysis. In one or some embodiments, the inspection program may further receive additional input, such as the location and/or severity of the fault.

Figure 5C:
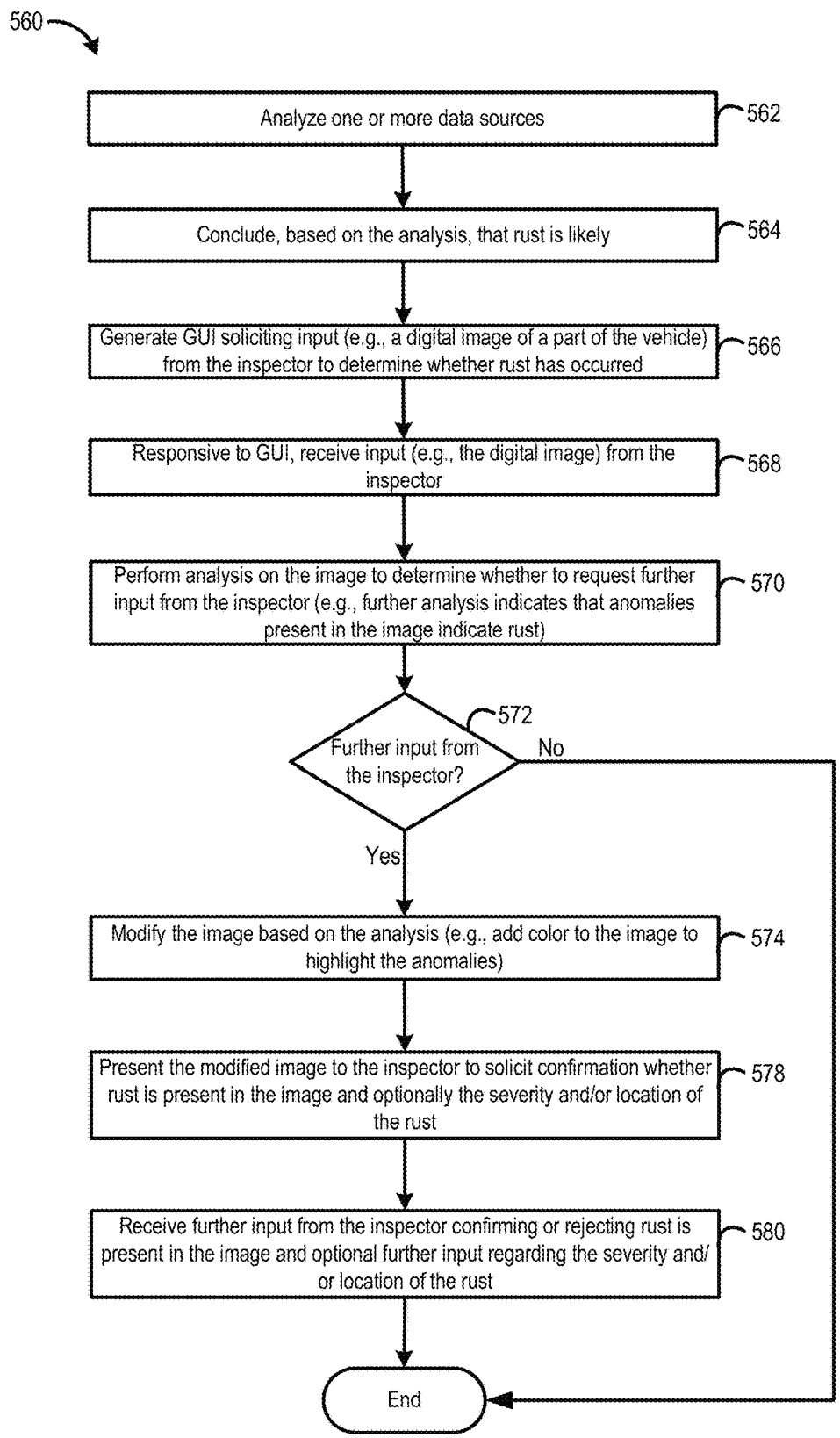
FIG. 5C illustrates a flow chart of generating a GUI to solicit input from the inspector to determine whether rust has occurred, performing analysis on the solicited input to identify anomalies, and requesting further input from the inspector based on the identified anomalies.

As discussed above, based on analysis of the one or more data sources, the inspection program may identify potential faults, such as whether there is an increased likelihood of rust on the vehicle. FIG. 5C illustrates a flow chart 560 of generating a GUI to solicit input from the inspector to determine whether rust has occurred, performing analysis on the solicited input to identify anomalies, and requesting further input from the inspector based on the identified anomalies. At 562, the inspection program analyzes one or more data sources. At 564, based on the analysis of the one or more data sources, the inspection program may conclude that rust is likely (e.g., the likelihood of rust is above a predetermined threshold). Given this likelihood determination, at 566, the inspection program may generate a GUI soliciting input (e.g., a digital image of a part of the vehicle) from the inspector to determine whether rust has occurred. Thus, in one or some embodiments, the inspection program may reduce the burden on the inspector to inspect items (such as only inspect items) that have a higher likelihood of fault.

At 568, responsive to generating the GUI, the inspection program receives the solicited input (e.g., the digital image) from the inspector. At 570, the inspection program performs analysis on the image to determine whether to request further input from the inspector (e.g., further analysis indicates that anomalies present in the image indicate rust). In one or some embodiments, the inspection program may perform the analysis in a single step in which the machine learning inputs both the input provided by the inspector and the one or more data sources in order to output the potential fault, such as rust, which may necessitate further input from the inspector.

Alternatively, the inspection program may follow a multi-step process to identify a potential fault including: (1) an initial analysis of the input provided by the inspector (such as using machine learning to analyze the digital image) to identify anomalies (and optionally to preliminarily determine the potential causes of the anomalies) without relying on the one or more data sources; and (2) a subsequent analysis that considers the results of the initial analysis and the one or more data sources in order to identify the potential fault. In the instance of identifying rust, a machine-learned model may analyze the digital image in order to identify one or more anomalous areas (e.g., based on training the machine learned model with images of anomalous features and/or images free of anomalous features), and may generate a preliminary assessment of the cause of the anomaly. After which, the inspection program may analyze the one or more data sources in order to identify the anomaly. Merely by way of example, responsive to identifying the anomaly, the inspection program may analyze data sources associated with: the year/make/model of the vehicle (e.g., to identify whether the year/make/model tend to rust or tend to scratch); the location where the vehicle resides (e.g., to determine whether the vehicle is in a location in the "rust-belt", supporting the conclusion that the anomaly is more likely rust); other publicly available information (e.g., weather information that correlates location with weather events, such as hail storms, which may support the conclusion that the anomaly is hail damage). In this regard, the inspection program may consider multiple data sources in order to assess the likelihood of a potential fault, such as rust.

Referring back to FIG. 5C, at 572, the inspection program determines whether to solicit further input from the inspector. If not, flow chart 560 ends. If so, at 574, the inspection program may modify one or more aspects of the image based on the analysis. For example, one or more overlays and/or colors may be added to the image to highlight the identified anomalies, as discussed further below with regard to FIGS. 9A-B. At 578, the inspection program presents the modified image to the inspector to solicit confirmation whether rust is present in the image and optionally the severity and/or location of the rust. At 580, responsive to presenting the modified image to the inspection, the inspection program receives further input from the inspector confirming or rejecting rust is present in the image and optional further input regarding the severity and/or location of the rust.

In this regard, the inspection program may perform the analysis of the vehicle data in combination with failure rates in order to identify the potential fault item as potential rust. Responsive to determining the potential fault item as the potential rust, the inspection program may cause a first GUI to be output, with the first GUI requesting one or more images of one or more areas of the vehicle. Responsive to causing the first GUI to be output, the inspection program receives the one or more images of the one or more areas of the vehicle, and analyzes the one or more images for potential rust. Based on the analysis, the inspection program may determine to request additional information regarding the potential rust from the inspector, and responsive thereto, the inspection program may cause a second GUI to be output, with the second GUI requesting the additional information regarding the potential rust and including one or both of: the one or more images or a link to the one or more images; or a modified version of the one or more images (e.g., highlighted in color). In response to sending the second GUI, the inspection program receives the additional information regarding the potential rust from the inspector.

Figure 5D:
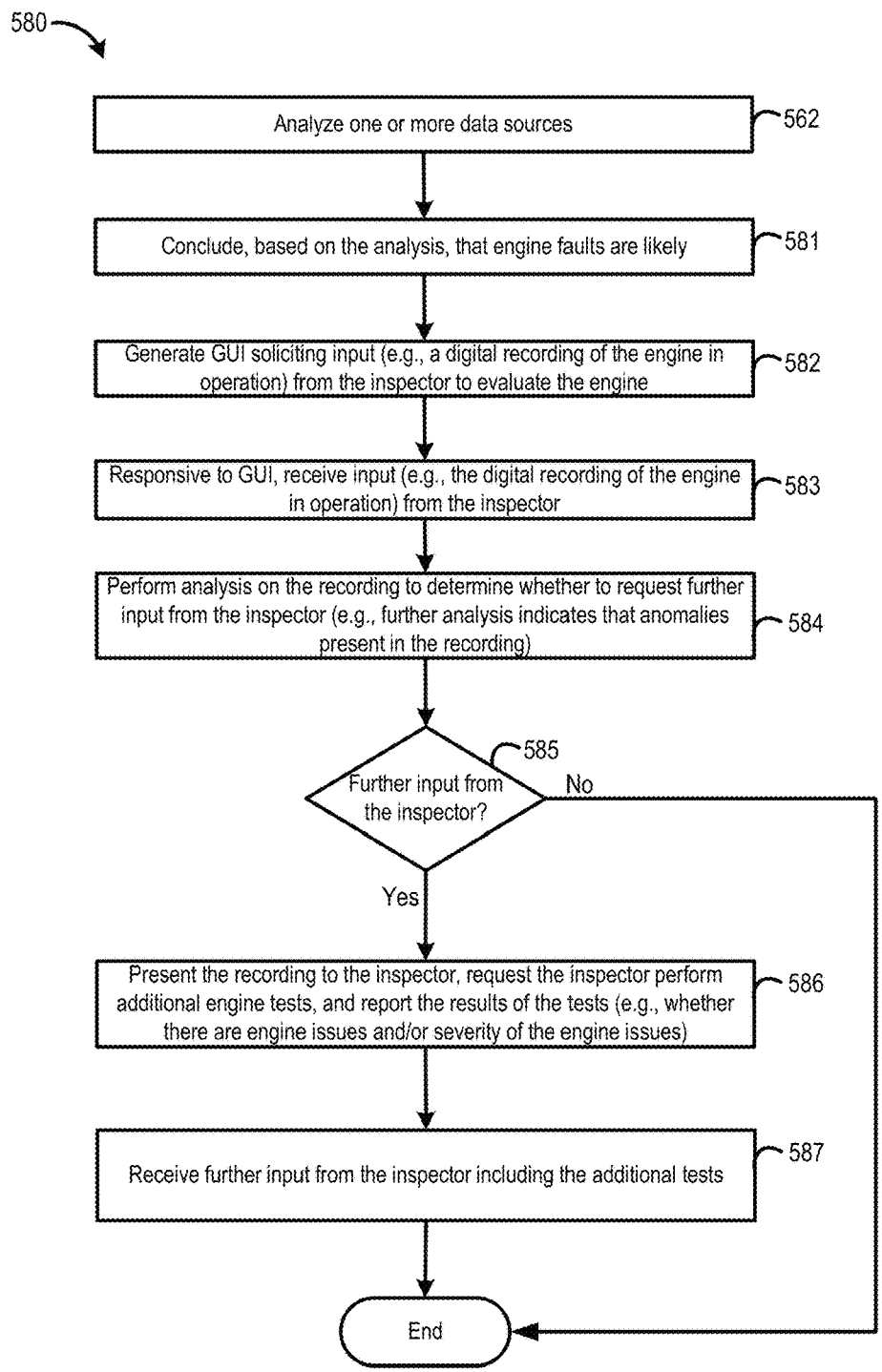
FIG. 5D illustrates a flow chart of generating a GUI to solicit input from the inspector to evaluate the engine, performing analysis on the solicited input to identify anomalies, and requesting further input from the inspector based on the identified anomalies.

Further, based on analysis of the one or more data sources, the inspection program may identify potential faults, such as whether there is an increased likelihood of engine fault. FIG. 5D illustrates a flow chart 580 of generating a GUI to solicit input from the inspector to evaluate the engine, performing analysis on the solicited input to identify anomalies, and requesting further input from the inspector based on the identified anomalies. At 562, the inspection program analyzes one or more data sources. At 581, based on the analysis of the one or more data sources, the inspection program may conclude that engine fault is likely (e.g., the likelihood of engine fault is above a predetermined threshold). Given this likelihood determination, at 582, the inspection program may generate a GUI soliciting input (e.g., a digital recording of the engine of the vehicle in operation) from the inspector to evaluate the engine.

At 583, responsive to GUI, the inspection program receives input (e.g., the digital recording of the engine in operation) from the inspector. At 584, the inspection program performs analysis on the recording to determine whether to request further input from the inspector (e.g., further analysis indicates that anomalies are present in the recording). As discussed above, the inspection program may perform the analysis in a single step or a multi-step process in order to identify the potential fault, such as a potential engine fault. At 585, the inspection program determines whether to seek further input from the inspector. If not, flow chart 580 ends. If so, at 586, the inspection program may perform any one, any combination, or all of: presenting the recording to the inspector; requesting the inspector perform additional engine tests; and reporting the results of the tests (e.g., whether there are engine issues and/or severity of the engine issues). This is discussed further with regard to FIG. 8. At 586, the inspection program receives the further input from the inspector including the additional tests.

In this regard, the inspection program may perform the analysis of the vehicle data in combination with failure rates in order to identify the potential fault item as potential engine failure. Responsive thereto, the inspection program may cause a first GUI to be output, with the first GUI requesting one or more recordings of an engine of the vehicle in operation. Responsive to sending the first GUI, the inspection program receives the one or more recordings of the engine of the vehicle in operation, and analyzes the one or more recordings of the engine of the vehicle in operation. The inspection program may determine, based on the analysis, whether to request additional information regarding the potential engine failure from the inspector. If so, the inspection program cause a second GUI to be output, with the second GUI requesting the additional information regarding the potential engine failure and including: the recording of the engine of the vehicle in operation or a link to the recording of the engine of the vehicle in operation. And, responsive to sending the second GUI, the inspection program receives the additional information regarding the potential engine failure from the inspector.

Figure 5E:
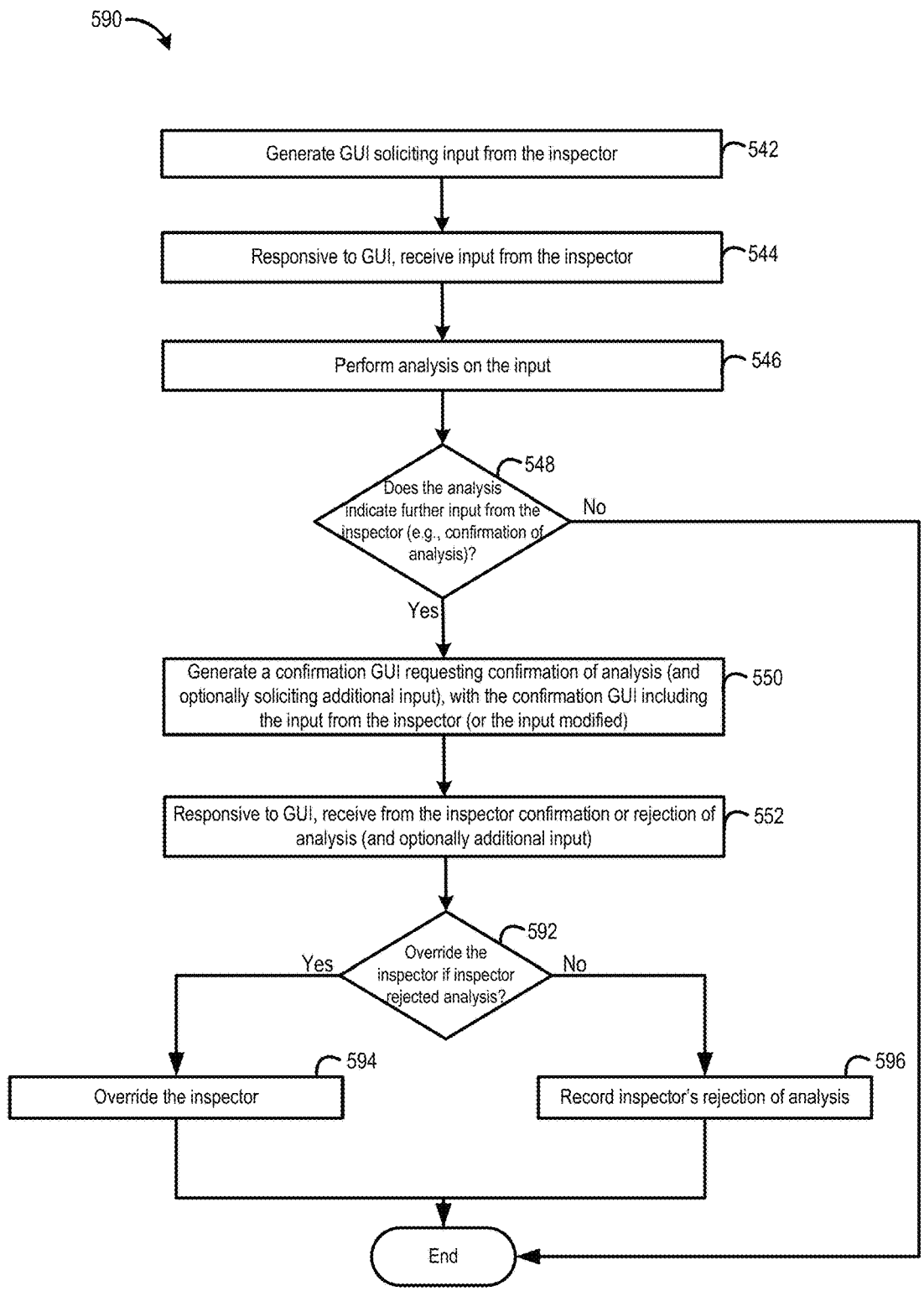
FIG. 5E illustrates a flow chart similar to FIG. 5B, with further determination whether to override the analysis of the inspector.

FIG. 5E illustrates a flow chart 590 similar to FIG. 5B, with further determination whether to override the analysis of the inspector. In particular, in certain instances, the inspection program may override (and in effect reject) the analysis of the inspector. In one or some embodiments, the inspection program's overriding of the analysis may be based on the additional information provided by the inspector. Alternatively, the inspection program may override the analysis of the inspector regardless of the input (e.g., the images, videos, recordings, answers or the like) provided by the inspector. Thus, at 592, the inspection program determines whether to override the inspector in the case where the inspector has rejected the analysis proffered by the inspection program. Specifically, the inspection program may request confirmation by the inspector of the inspection program's conclusion of fault. In certain instances (e.g., where the inspection program determines that the likelihood of fault is above a predetermined amount), even if the inspector rejects the inspection program's conclusion, the inspection program may override the inspector (and conclusively determined that the vehicle suffers from the fault). In such an event, at 594, the inspection program overrides the opinion of the inspection. Otherwise, at 596, the inspection program records the inspector's rejection of the analysis as part of the report.

Figure 6:
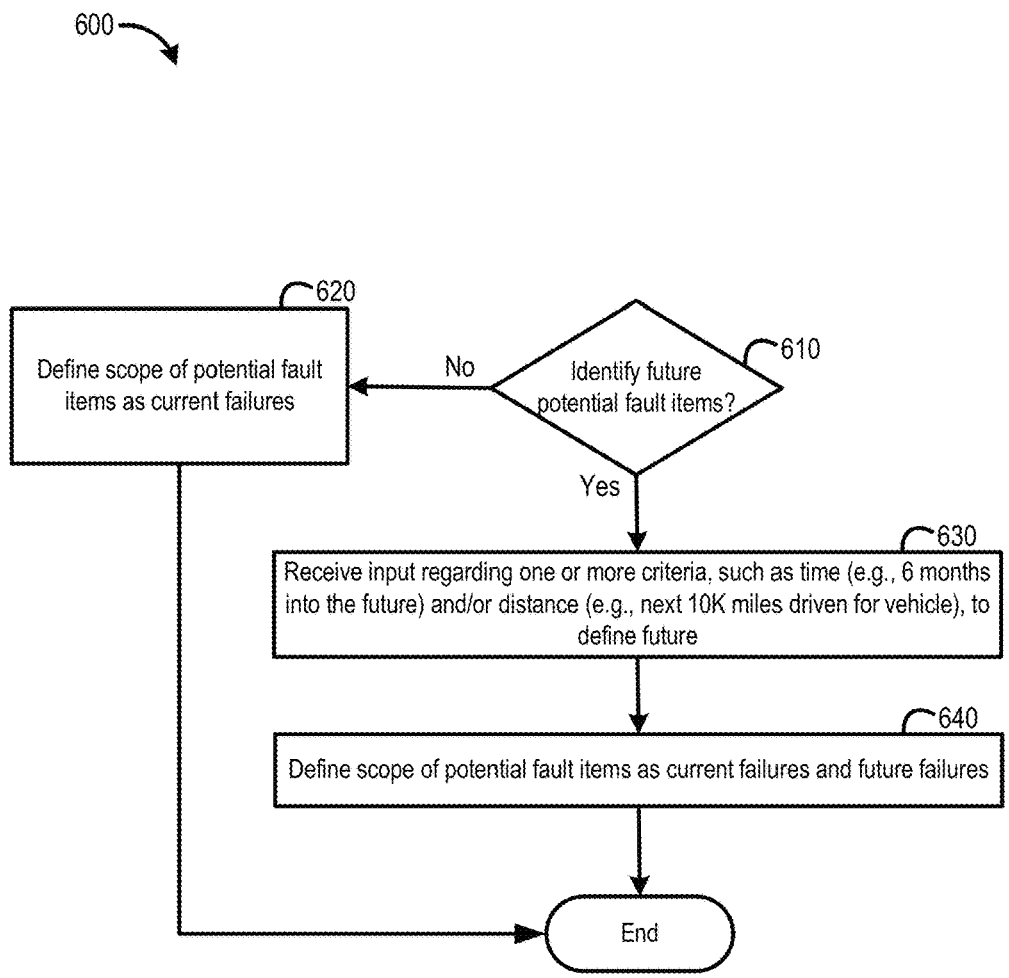
FIG. 6 illustrates a flow chart of defining the scope of potential fault items to current or future potential fault items.

In certain instances, the buyer and/or the seller may wish to determine whether the vehicle will fail within a defined future period. For example, the seller, in selling the vehicle, may seek to warrant the vehicle for a certain time (e.g., 6 months after the sale of the vehicle and/or for a certain distance driven by the vehicle (e.g., the next 10,000 miles after the sale of the vehicle. As such, the inspection may encompass identifying both current fault items and future fault items (e.g., items that have not currently failed, but are expected to fail within the defined future period). In particular, FIG. 6 illustrates a flow chart 600 of defining the scope of potential fault items to current or future potential fault items. In one or some embodiments, the focus of the inspection is identifying current fault items in the vehicle. Alternatively, the focus of the inspection is identifying both current fault items and future fault items in the vehicle. In particular, at 610, the inspection program determines whether to identify future potential fault items. If not, at 620, the inspection program defines the scope of potential fault items as current failures. If so, the inspection program defines the future, for purposes of identifying faults. In particular, at 630, the inspection program receives input regarding one or more criteria, such as time (e.g., within the next 6 months) and/or distance (e.g., within the next 10,000 miles driven for the vehicle) to define the future for purposes of identifying faults. The input may be responsive to providing one or more GUIs to the inspector, with the one or more GUIs enabling the inspector to designate the future period. As one example, one or more pull-down menus may be used to designate the time and/or distance to designate the future period (e.g., pull-down menu for designating the time period including pull-down options for 3 months, 6 months, 1 year, etc., thereby limiting the inspector to a discrete set of options in order to enable the inspector to select one of the pull-down options to define the time period). As another example, the one or more GUIs may include a field in which the inspector may input the defined time period. In turn, at 640, the inspection program defines the scope of potential fault items as current failures and future failures. This defined scope may be used at 504 in order to identify potential fault items. In particular, the defined period may be used by the rules in order to determine whether a respective item should be designated as a potential fault item. For example, in a future defined as within the next 10,000 miles, the inspection program may add 10,000 miles to the current mileage of the vehicle in order to determine whether the respective item, according to the rules, should be designated as a potential fault item. Further, optionally, in stepping through the different fault items (see 506 to 524 in FIG. 5A), the inspector may be notified whether the respective fault item is considered as a potential "current failure" or a potential "future failure", thereby providing the inspector with additional information.

Figure 7A:
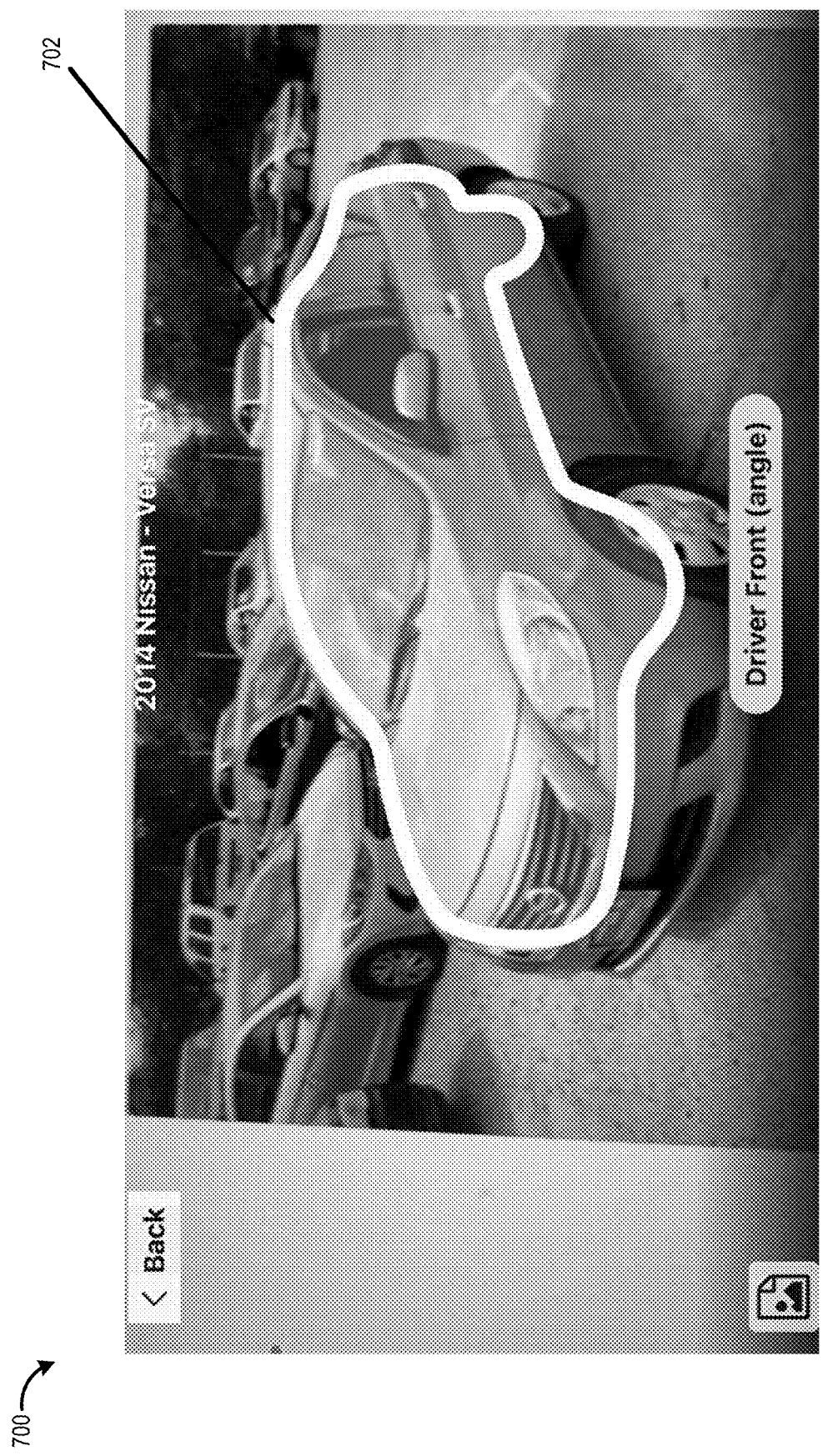

FIGS. 7A-E are GUIs of a sequence to guide the inspector to obtain one or more images of the vehicle and to evaluate the transmission. In particular, FIG. 7A shows a GUI 700 with an outline 702 superimposed on a video stream image in order to capture a predetermined view (drive front (angle)) of the vehicle. See, for example, U.S. Pat. Nos. 10,089,396 or 10,997,413, both of which are incorporated by reference herein in their entirety.

Figure 7B:
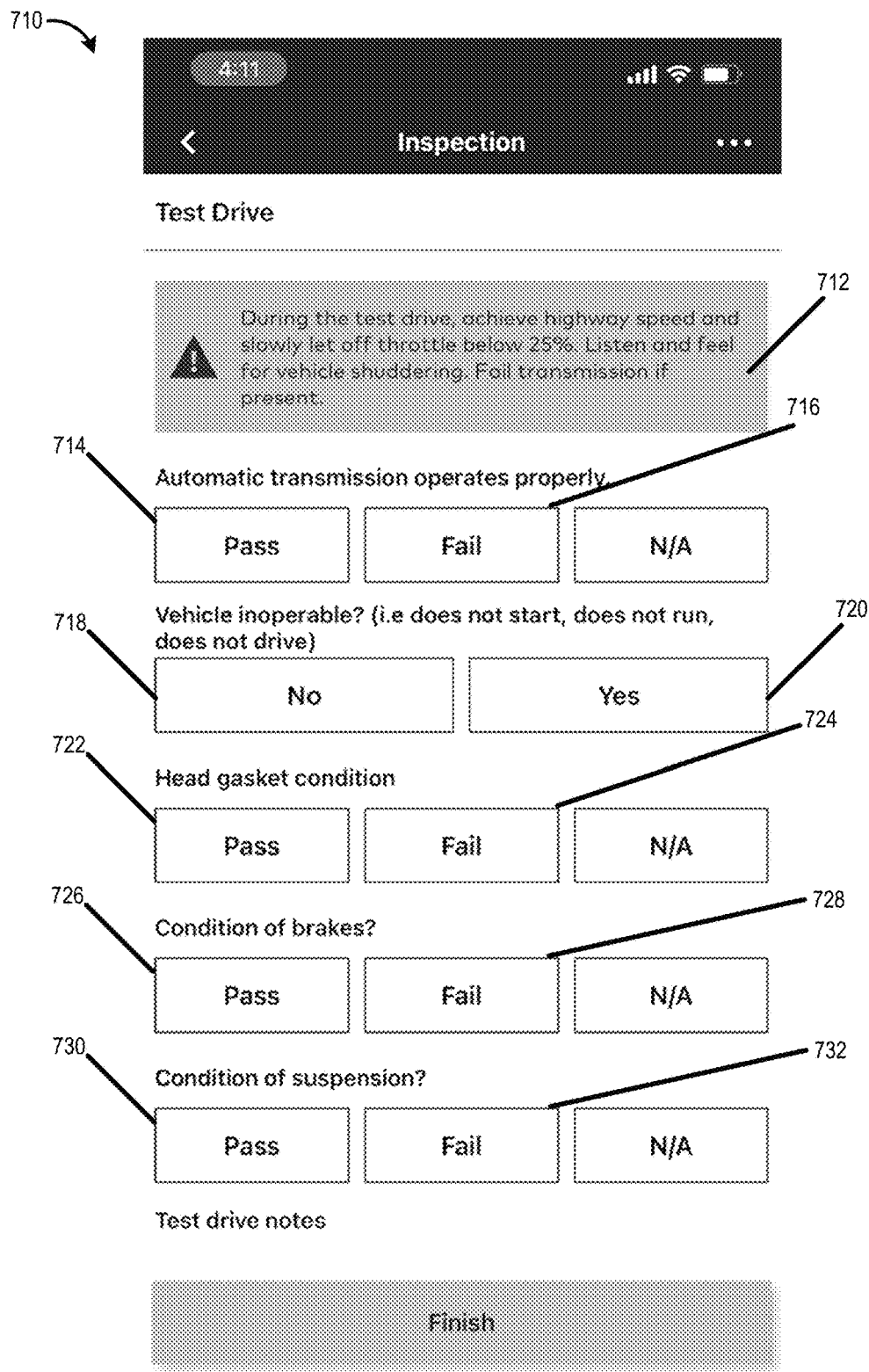

FIG. 7B is a GUI 710 for guiding the inspector to inspect a part of the vehicle (in this instance the automatic transmission). As discussed above, one or more factors may indicate a high likelihood (e.g., above a predetermined percentage) that the automatic transmission is faulty. Responsive to this determination, the inspection program may generate GUI 710 in order to guide the inspector to perform the inspection. As shown, GUI 710 may include instructions 712 to perform the inspection. Further, the instructions may include one or more markers to provide visual cues to the inspector to indicate the potential likelihood of fault for the respective part. As one example, the instructions 712 may have a color associated with them (e.g., green to indicate lowest likelihood of fault; yellow to indicate higher likelihood of fault; red to indicate highest likelihood of fault). As shown in FIG. 7B, the background of the instructions 712 has an associated color to indicate the level of likelihood of fault. Alternatively, the color of the font of the instructions 712 may be selected to indicate the level of likelihood of fault.

As shown in FIG. 7B, GUI 710 includes sections for the inspector to indicate whether the automatic transmission is operating properly (Pass 714 and fail 716) and whether the vehicle is inoperable (No 718 and Yes 720). GUI further includes sections for inspector input regarding other parts of the vehicle including the head gasket condition (Pass 722 and fail 724), condition of the brakes (Pass 726 and fail 728), and condition of the suspension (Pass 730 and fail 732).

Figure 7C:
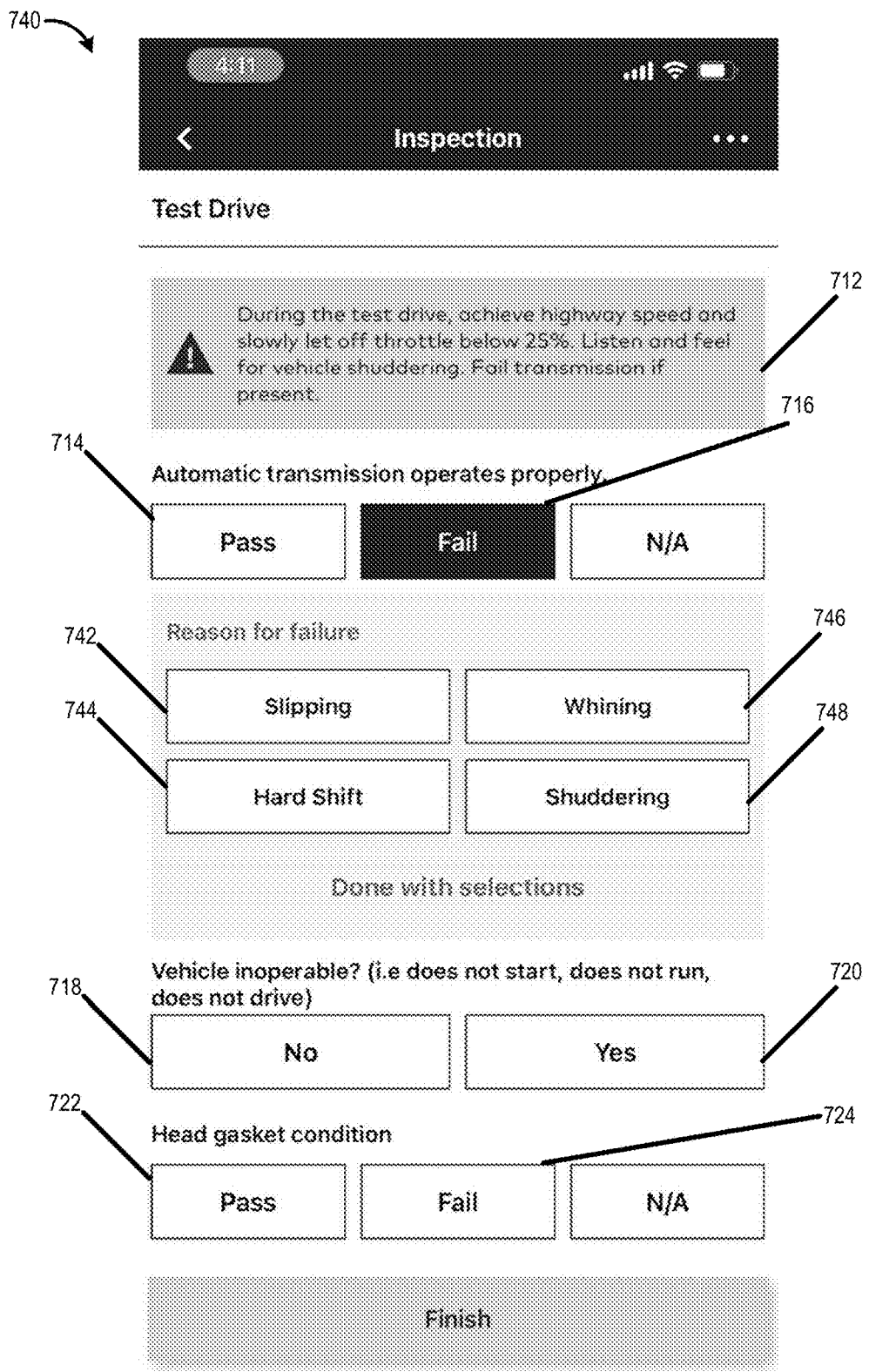
Figure 7D:
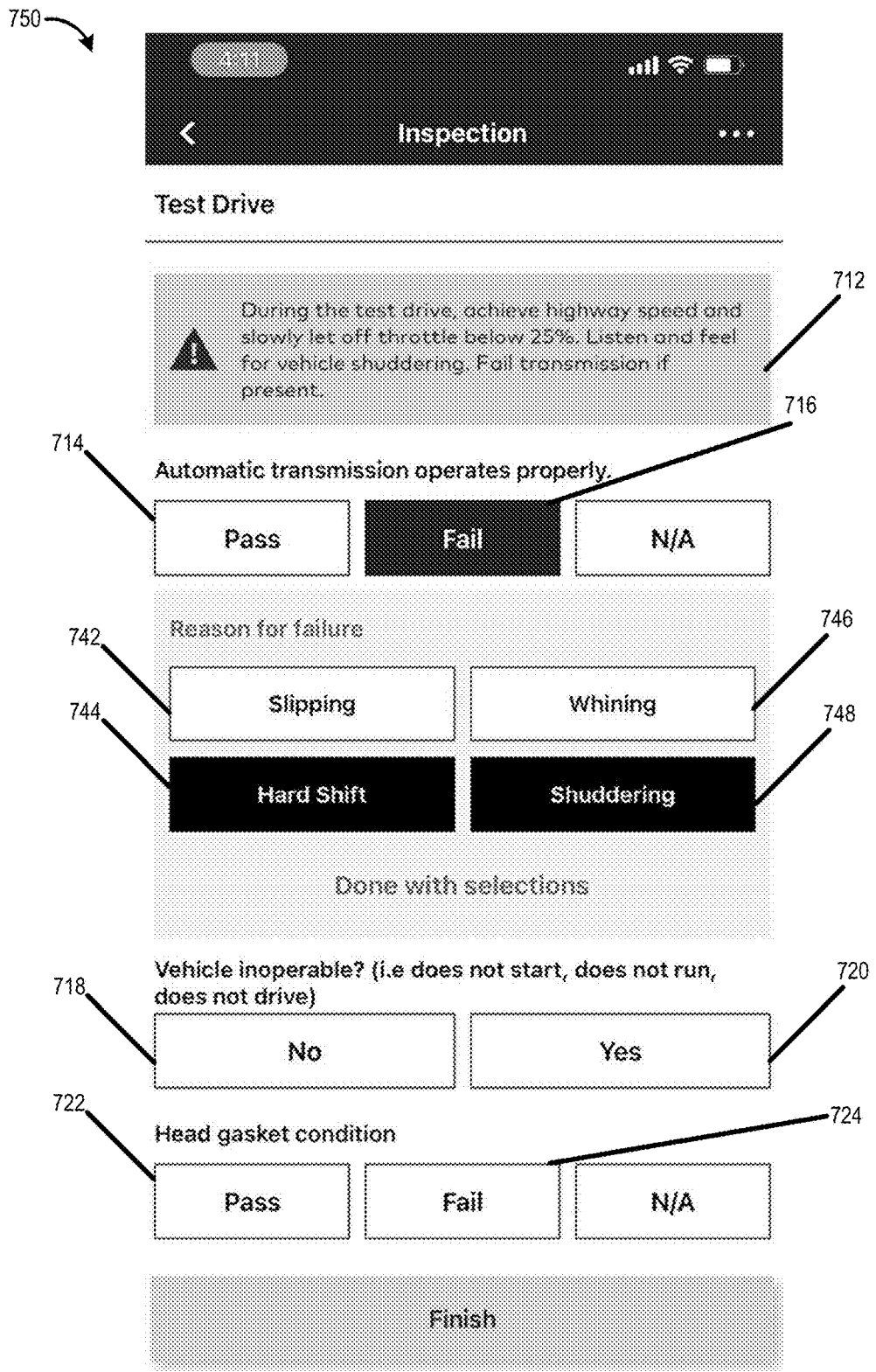
Figure 7E:
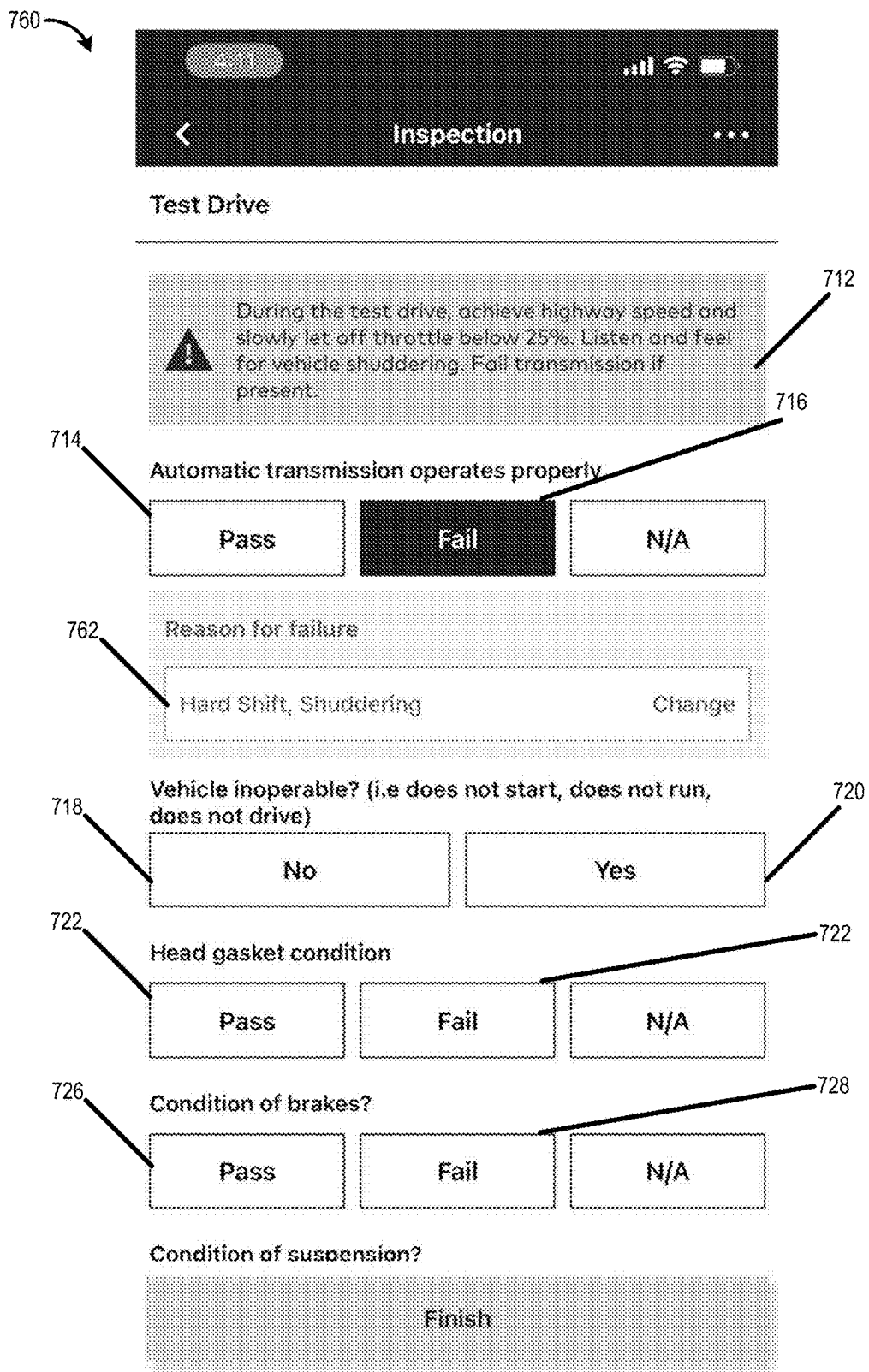

FIGS. 7C-E show successive example GUIs in the sequence. Specifically, FIG. 7C includes a GUI 740 as a subsequent screen responsive to electing Fail 716 in GUI 710. As shown, responsive to the election of Fail 716, the inspector is presented with a plurality of potential reasons for failure of the automatic transmission including slipping 741, hard shift 744, whining 746, and shuddering 748. FIG. 7D illustrates a GUI 750 in which the inspector elects hard shift 744 and shuddering 748. Responsive thereto, FIG. 7E illustrates a GUI 760 in which the reasons for failure (previously input in FIG. 7D) are confirmed with the reasons listed at 762.

FIG. 8 is a GUI 800 to guide the inspector to evaluate the engine of the vehicle. As discussed above, based on the analysis of the one or more data sources, the inspection program may flag the engine to the inspector for special attention, such a to obtain an engine recording of the engine. As discussed above with regard to FIG. 5D, the inspection program may analyze the recording to determine whether further input from the inspector is warranted. If so, GUI 800 may be presented to the inspector, with the GUI 800 including the recording 820 previously obtained by the inspector (e.g., an icon to play the recording), and one or more sections of the GUI 800 soliciting further input from the inspector including confirming upper engine noise (No 830 or Yes 832) and rating severity (Clicking 840, Ticking 842, Rattling 844, Tapping 846). In this way, the inspection program may bookend the analysis of a respective part, in this instance the engine, by first requesting information regarding the respective part (e.g., the engine recording), by then analyzing the requested information, and responsive to the analysis, requesting additional information regarding the respective part. Further, the GUI 800 requesting the additional information may further include the originally requested information (e.g., the icon to play the engine recording) along with the request for the additional information.

FIGS. 9A-B are GUIs 900, 950 to guide the inspector to evaluate whether rust is present in the vehicle. As discussed above, various factors may indicate a higher likelihood of rust in the vehicle. See FIG. 5C. Responsive to determining the higher likelihood of rust in the vehicle, the inspection program may request the inspector to obtain various images of the vehicle (e.g., an image of the wheel well and/or the undercarriage). The inspection program may then analyze the obtained images in order to determine whether rust appears to be present. As discussed above, this determination may be performed in a single step or in a multi-step process. In particular, with the multi-step process, a machine-learned program may first identify anomalies (and initial indications as to the reason(s) for the anomalies). Thereafter, the inspection program may perform further analysis, such as accessing additional data sources (e.g., location, model/vehicle information) in order to further assess the reason(s) for the anomalies.

Referring back to FIG. 9A, GUI 900 is generated responsive to the inspection program assessing a higher likelihood of rust. GUI 900 includes instructions 910, which may be highlighted with color, as discussed above. GUI 900 further includes image 920 highlighted with various indicia. As discussed above, the inspection program may bookend the analysis of a respective part, in this instance the body for rust, by first requesting information regarding the respective part (e.g., the image(s)), by then analyzing the requested information, and responsive to the analysis, requesting additional information regarding the respective part. As shown in FIG. 9A, GUI 900 includes the image 920 modified to include the indicia, which may be a colorized framing indicia (e.g., rectangle 922), a colorized outline 924 of the potential area of rust, and a colorized interior 926 of the potential area of rust. As discussed above, the machine-learned model may output the outline of the anomaly. Responsive to further analysis by the inspection program, the inspection program may add any one, any combination, or all of the following to the output of the machine learned model: (1) the colorized framing indicia (e.g., the rectangle 922 that encompasses the entirety of the anomaly); the colorized outline 924; or the colorized interior 926. In this way, the inspector may be presented with the modified and highlighted image previous obtained by the inspector. The inspector may further be presented with a request for additional information, such as to confirm whether there is rust (No 930 or Yes 932), and/or to rate the severity of the rust (⅛"-2" (940), 2"-6" (942), 6"-10" (944), 10"-14" (946)).

FIG. 9B illustrates another GUI 950 to obtain additional information from the inspector regarding rust, including image 960. Image 960 includes bounding boxes 962, 964 (which may be superimposed on image and colored in red), outlines 966, 968 (which may be superimposed on image and colored in red), and interior shading 970, 972 (which may be superimposed on image and colored in red).

Although the invention has been described with reference to the embodiments illustrated in the attached drawing figures, it is noted that equivalents may be employed, and substitutions made herein without departing from the scope of the invention.

The invention claimed is:

1. A computing system configured for use by an inspector of a vehicle, the computing system comprising:
   at least one output device;
   at least one memory, the at least one memory configured to store one or more programs; and
   at least one processor in communication with the at least one output device and the at least one memory, and configured to execute instructions in the one or more programs to:
      access vehicle data indicative of a selected vehicle, wherein the vehicle data comprises one or more of a make and model of the vehicle, engine information of the vehicle, mileage of the vehicle, a transmission type of the vehicle, a vehicle identification number (VIN) of the vehicle, a production year of the vehicle, a current location of the vehicle, or a location where the vehicle resides;
      responsive to analysis of the vehicle data in combination with failure rates associated with at least one component of the vehicle determining that the at least one component is designated as a potential fault item, access information indicative of instructing the inspector of the vehicle to obtain additional information regarding the at least one component of the vehicle that is designated as the potential fault item;
      cause at least one output on the at least one output device, the at least one output including the information indicative of instructing the inspector to obtain at least one image regarding the at least one component of the vehicle that is designated as the potential fault item, the at least one output comprising one or both of a graphic highlighting part or all of the at least one component or one or more steps in order for the inspector to obtain the additional information regarding the at least one component of the vehicle that is designated as the potential fault item;
      responsive to generating the at least one output, receive input from the inspector, the input comprising the at least one image of the at least one component of the vehicle that is designated as the potential fault item;
      automatically analyze the at least one image of the at least one component of the vehicle that is designated as the potential fault item in order to determine whether to request additional input regarding the at least one component that is designated as the potential fault item of the vehicle;
      responsive to the determining to request the additional input regarding the at least one component that is designated as the potential fault item of the vehicle:
         modify the at least one image of the at least one component of the vehicle that was input from the inspector in order to highlight at least one aspect of the at least one component in the modified at least one image;
         output the modified at least one image of the at least one component of the vehicle that was input from the inspector in order to solicit the additional input regarding the at least one component; and
         receive the additional input from the inspector regarding the at least one component; and
      generate at least one inspection report regarding the vehicle.

2. The computing system of claim 1, wherein the at least one processor is further configured, when executing the instructions, to:
   analyze the vehicle data in combination with the failure rates associated with the at least one component of the vehicle in order to determine that the at least one component is designated as a potential fault item.

3. The computing system of claim 1, wherein the analysis of the vehicle data identifies at least a first component designated as failing without input from the inspector and a second component designated as the potential fault item;
   wherein the at least one processor is configured to:
      generate a first component output to the inspector indicating that the first component failed without further need for inspection; and
      generate a second component output to the inspector indicating that the second component is designated as a potential fault item that requires the inspector to obtain the at least one image.

4. The computing system of claim 1, wherein the at least one output comprises an image modified by a graphic to highlight the at least one component of the vehicle so that a portion of the image is color-modified in order to instruct the inspector to perform a visual examination of the potential fault item associated with the portion of the image that is color-modified.

5. The computing system of claim 1, wherein the analysis of the vehicle data in combination with the failure rates determines that a plurality of components are designated as potential fault items;
   wherein the potential fault items are determined as failing serially; and
   wherein the processor is further configured to serially receive input from the inspector regarding reconditioning responsive to designating a respective potential fault items as failing.

6. The computing system of claim 5, wherein the processor is configured to generate a total reconditioning cost based on the serially received input from the inspector regarding reconditioning.

7. The computing system of claim 1, wherein the processor is further configured to input one or both of a future time or a future distance to be traveled by the vehicle; and
   wherein the analysis of the vehicle data in combination with the failure rates determines the potential fault items for the vehicle at least to the future time or the future distance to be traveled by the vehicle.

8. The computing system of claim 1, wherein the vehicle data comprises the location where the vehicle resides;

wherein the failure rates are correlated to location; and
wherein the analysis of the vehicle data in combination with the failure rates determines the potential fault item based on the location where the vehicle resides and the failure rates correlated to location.

9. The computing system of claim 1, wherein the processor is further configured to:
receive diagnostic data about the vehicle via an electronic vehicle management system;
analyze the diagnostic data received via the electronic vehicle management system; and
determine an inspection recommendation of the at least one component based at least in part on the diagnostic data received via the electronic vehicle management system.

10. The computing system of claim 1, wherein the vehicle data comprises sensor data of a recorded sound of the vehicle; and
wherein the processor is further configured to:
compare a first signal indicative of the recorded sound of the vehicle to a second signal indicative of a sound of a properly working vehicle of a same make and model; and
recommend inspection of the vehicle based at least in part on the comparison of the first signal and the second signal.

11. The computing system of claim 1, wherein the processor is configured to:
perform an analysis of the vehicle data in combination with failure rates in order to identify the potential fault item;
cause a first GUI to be output, the first GUI requesting information regarding the potential fault item;
responsive to causing the first GUI to be output, receive the information regarding the potential fault item from the inspector;
analyze the information regarding the potential fault item from the inspector;
determine, based on the analysis, to request additional information regarding the at least one component of the vehicle that is designated as the potential fault item from the inspector;
responsive to determining to request the additional information regarding the at least one component of the vehicle that is designated as the potential fault item from the inspector, cause a second GUI to be output, the second GUI requesting the additional information regarding the at least one component of the vehicle that is designated as the potential fault item and including one or both of: the information or a link to the information; or a modified version of the information; and
responsive to causing the second GUI to be output, receive the additional information regarding the at least one component of the vehicle that is designated as the potential fault item from the inspector.

12. The computing system of claim 11, wherein the processor is configured to perform the analysis of the vehicle data in combination with failure rates in order to identify the potential fault item as potential rust;
wherein responsive to determining the potential fault item as the potential rust, the processor is configured to cause the first GUI to be output, the first GUI requesting one or more images of one or more areas of the vehicle;
wherein responsive to causing the first GUI to be output, the processor is configured to receive the one or more images of the one or more areas of the vehicle;
wherein the processor is configured to analyze the one or more images regarding the potential fault item from the inspector;
wherein the processor is configured to determine, based on the analysis, to request additional information regarding the potential rust from the inspector;
wherein responsive to determining to request the additional information regarding the at least one component of the vehicle that is designated as the potential fault item from the inspector, the processor is configured to cause the second GUI to be output, the second GUI requesting the additional information regarding the potential rust and including one or both of: the one or more images or a link to the one or more images; or a modified version of the one or more images; and
wherein responsive to causing the second GUI to be output, the processor is configured to receive the additional information regarding the potential rust from the inspector.

13. The computing system of claim 12, wherein the processor is configured in the second GUI to include the modified version of the one or more images by modifying color to highlight the potential rust in the one or more images.

14. The computing system of claim 13, wherein the processor is configured to generate the modified version of the one or more images by adding one or more of a colorized framing box in the one or more images that frames the potential rust, a colorized outline in the one or more images that outlines the potential rust, or a colorized interior in the one or more images that colors the potential rust.

15. The computing system of claim 12, wherein the processor is configured to perform the analysis of the vehicle data in combination with failure rates in order to identify the potential fault item as potential engine failure;
wherein responsive to determining the potential fault item as the potential engine failure, the processor is configured to cause the first GUI to be output, the first GUI requesting one or more recordings of an engine of the vehicle in operation;
wherein responsive to causing the first GUI to be output, the processor is configured to receive the one or more recordings of the engine of the vehicle in operation;
wherein the processor is configured to analyze the one or more recordings of the engine of the vehicle in operation;
wherein the processor is configured to determine, based on the analysis, to request additional information regarding the potential engine failure from the inspector;
wherein responsive to determining to request the additional information regarding the at least one component of the vehicle that is designated as the potential fault item from the inspector, the processor is configured to cause the second GUI to be output, the second GUI requesting the additional information regarding the potential engine failure and including: the recording of the engine of the vehicle in operation or a link to the recording of the engine of the vehicle in operation; and
wherein responsive to causing the second GUI to be output, the processor is configured to receive the additional information regarding the potential engine failure from the inspector.

16. The computing system of claim 1, wherein the at least one inspection report further includes a reconditioning estimate for reconditioning the vehicle for resale.

17. The computing system of claim 16, wherein, responsive to the automatic analysis of the at least one image, the at least one processor is configured to request the inspector to provide reconditioning information for the at least one component.

18. The computing system of claim 16, wherein the at least one inspection report includes a total reconditioning estimate for reconditioning a plurality of faults identified by inspection of the vehicle.

19. The computing system of claim 18, wherein the total reconditioning estimate is for reconditioning the vehicle from a wholesale condition to a retail condition.

20. The computing system of claim 1, wherein, responsive to the automatic analysis of the at least one image, the at least one processor is configured to request the inspector to confirm that the at least one component of the vehicle is faulty; and
    wherein, the at least one processor, responsive to receiving input from the inspector confirming that the at least one component of the vehicle is faulty, is configured to designate the at least one component of the vehicle as faulty.

21. The computing system of claim 1, wherein the at least one processor is configured to automatically analyze the at least one image of the at least one component of the vehicle to determine whether the at least one component is a potential fault of the vehicle and to determine a location of the potential fault in or on the vehicle; and
    wherein the at least one processor is configured to request the inspector to confirm the location of the potential fault in or on the vehicle.

22. The computing system of claim 1, wherein the at least one processor is configured to modify the at least one image by adding at least one overlay onto the at least one image.

23. The computing system of claim 22, wherein the at least one processor is configured to shape the at least one overlay based on automatically analyzing the at least one image.

24. The computing system of claim 23, wherein the potential fault of the vehicle is on an exterior of the vehicle with an outline; and
    wherein the at least one processor is configured to shape the at least one overlay based on the outline.

25. The computing system of claim 23, wherein the potential fault of the vehicle comprises at least one of scratches, dents, rust, or frame warping.

26. The computing system of claim 1, wherein the at least one processor is configured to modify the at least one image by adding at least one color onto the at least one image.

27. The computing system of claim 1, wherein the at least one processor is configured to automatically analyze the at least one image using machine learning.

28. The computing system of claim 27, wherein the at least one processor is configured to automatically analyze the at least one image using the machine learning trained to detect damage on one or both of an exterior and an interior of the vehicle.

29. The computing system of claim 1, wherein the at least one processor is configured to access vehicle data by accessing diagnostic data resident on the vehicle;
    wherein the at least one processor is configured to determine the at least one component designated as the potential fault item based on the diagnostic data resident on the vehicle; and
    wherein the at least one processor is configured to determine one or more inspection recommendations based on the at least one component based designated as the potential fault item.

30. The computing system of claim 29, wherein the at least one processor is configured to access the diagnostic data resident on the vehicle via an OBD port.

31. The computing system of claim 30, wherein the at least one processor is configured to use machine learning and the diagnostic data resident on the vehicle via the OBD port in order to determine the at least one component designated as the potential fault item.

32. A method for inspecting a vehicle in order to generate an inspection report, the method comprising:
    accessing vehicle data indicative of a selected vehicle, wherein the vehicle data comprises one or more of a make and model of the vehicle, engine information of the vehicle, mileage of the vehicle, a transmission type of the vehicle, a vehicle identification number (VIN) of the vehicle, a production year of the vehicle, a current location of the vehicle, or a location where the vehicle resides;
    responsive to analysis of the vehicle data in combination with failure rates associated with at least one component of the vehicle determining that the at least one component is designated as a potential fault item, accessing information indicative of instructing an inspector of the vehicle to obtain additional information regarding the at least one component of the vehicle that is designated as the potential fault item;
    causing at least one output on at least one output device, the at least one output including the information indicative of instructing the inspector to obtain at least one image regarding the at least one component of the vehicle that is designated as the potential fault item, the at least one output comprising one or both of a graphic highlighting part or all of the at least one component or a one or more steps in order for an inspector to obtain the additional information regarding the at least one component of the vehicle that is designated as the potential fault item;
    responsive to generating the at least one output, receiving input from the inspector, the input comprising the at least one image of the at least one component of the vehicle that is designated as the potential fault item;
    automatically analyzing the at least one image of the at least one component of the vehicle that is designated as the potential fault item in order to determine whether to request additional input regarding the at least one component that is designated as the potential fault item of the vehicle;
    responsive to the determining to request the additional input regarding the at least one component that is designated as the potential fault item of the vehicle:
    modifying the at least one image of the at least one component of the vehicle that was input from the inspector in order to highlight at least one aspect of the at least one component in the modified at least one image;
    outputting the modified at least one image of the at least one component of the vehicle that was input from the inspector in order to solicit the additional input regarding the at least one component; and
    receiving the additional input from the inspector regarding the at least one component; and
    generating at least one inspection report regarding the vehicle.

33. The method of claim 32, wherein modifying the at least one image comprises adding at least one overlay onto the at least one image.

34. The method of claim 33, wherein the at least one overlay is shaped based on the automatically analyzing of the at least one image.

35. The method of claim 34, wherein the potential fault of the vehicle is on an exterior of the vehicle with an outline; and wherein the at least one overlay is shaped based on the outline.

36. The method of claim 32, wherein modifying the at least one image comprises adding at least one color onto the at least one image.

37. The method of claim 32, wherein automatically analyzing the at least one image comprises using machine learning.

38. The method of claim 32, wherein accessing vehicle data comprises accessing diagnostic data resident on the vehicle;

wherein determining the at least one component designated as the potential fault item is based on the diagnostic data resident on the vehicle; and wherein determining one or more inspection recommendations is based on the at least one component based designated as the potential fault item.

39. The method of claim 38, wherein accessing the diagnostic data resident on the vehicle is via an OBD port.

40. The method of claim 39, wherein machine learning and the diagnostic data resident on the vehicle via the OBD port are used in order to determine the at least one component designated as the potential fault item.

* * * * *

UNITED STATES PATENT AND TRADEMARK OFFICE
CERTIFICATE OF CORRECTION

PATENT NO. : 12,236,733 B2  
APPLICATION NO. : 17/412690  
DATED : February 25, 2025  
INVENTOR(S) : Shuchita Singh and Jason Houseworth Page 1 of 1

It is certified that error appears in the above-identified patent and that said Letters Patent is hereby corrected as shown below:

In the Claims

Column 28 (Claim 15; Line 33):
"The computing system of claim 12, wherein the processor is configured to perform the analysis of the vehicle data in combination with failure rates in order to identify the potential fault item as potential engine failure;"

Should be replaced with:
"The computing system of claim 11, wherein the processor is configured to perform the analysis of the vehicle data in combination with failure rates in order to identify the potential fault item as potential engine failure;"

Signed and Sealed this  
Fifteenth Day of April, 2025

Coke Morgan Stewart  
*Acting Director of the United States Patent and Trademark Office*